United States Patent [19]

Hampton et al.

[11] Patent Number: 5,323,317
[45] Date of Patent: Jun. 21, 1994

[54] METHOD AND APPARATUS FOR DETERMINING RUNOFF USING REMOTE GEOGRAPHIC SENSING

[76] Inventors: Terry L. Hampton, 5217 Shawano Ter.; M. Carson Mettel, 206 Standish Ct., both of Madison, Wis. 53705

[21] Appl. No.: 664,564

[22] Filed: Mar. 5, 1991

[51] Int. Cl.$^5$ .............................................. G01V 1/00
[52] U.S. Cl. .................................................. 364/420
[58] Field of Search ............. 73/170 R; 364/420, 422; 358/109

[56] References Cited

U.S. PATENT DOCUMENTS

| | | | |
|---|---|---|---|
| 3,598,980 | 8/1971 | Lawrence et al. | 235/181 |
| 4,227,211 | 10/1980 | Disbrow | 358/113 |
| 4,908,763 | 3/1990 | Sundberg | 364/420 |

FOREIGN PATENT DOCUMENTS 63-238591  10/1988  Japan .

OTHER PUBLICATIONS

Water Resources Bulletin, American Water Resources Association, Dec., 1986, Draper et al., vol. 26 No. 6.
IEE Transactions on Geoscience and Remote Sensing, vol. GE-22, No. 6, Nov. 1984.
Water Resources Bulletin, American Water Resources Association, Feb. 1990, vol. 1, Rango et al.
P. A. DeBarry et al., "Computer Watersheds", *Civil Engineering*, vol. 60, No. 7, pp. 67-70 (Jul. 1990).
W. Skipwith et al., "Closing the Floodgates", *Civil Engineering*, vol. 60, No. 7, pp. 54, 55 (Jul. 1990).

*Primary Examiner*—Roy N. Envall, Jr.
*Assistant Examiner*—Frantzy Poinvil
*Attorney, Agent, or Firm*—Roylance, Abrams, Berdo & Goodman

[57] ABSTRACT

Images of a selected geographic region are obtained using remote sensing apparatus and are processed to determine characteristic spectral reflectance patterns associated with different ground covers and soil types in the region. The image processing means compares the spectral reflectance patterns to image pixel values in order to classify each pixel in a ground cover or soil type class, the corresponding spectral reflectance pattern for which matches the pixel value. In a preferred embodiment of the invention, Geographic Information System (GIS) software is utilized to combine a remotely sensed image providing ground cover classifications for a geographic region with a remotely sensed image providing soil type classifications for the same region in order to generate a rainfall loss function. The rainfall loss function can then be used to determine a runoff curve number (RCN) for the region, to determine probable maximum flood (PMF), or to generate various design flood hydrographs corresponding to different precipitation events using a computer water shed model.

32 Claims, 14 Drawing Sheets

| COVER | PRACTICE | CONDITION | NUMBER OF ACRES PER CLASS | | | | PRODUCT |
| --- | --- | --- | --- | --- | --- | --- | --- |
| | | | A SOILS | B SOILS | C SOILS | D SOILS | |
| ROW CROPS | Contoured | Good | 1320.6 | 50.0 | 34.7 | 5.3 | 92897.6 |
| SMALL GRAINS | Contoured | Good | 89.4 | 10.0 | 8.7 | 0.0 | 6886.9 |
| LEGUMES OR ROTATION MEADOW | Contoured | Good | 49.6 | 6.0 | 1.1 | 0.0 | 3228.9 |
| PASTURE | | Good | 18698.0 | 1571.7 | 473.3 | 394.8 | 891700.4 |
| MEADOW (permanent) | | Good | 23467.0 | 2501.4 | 757.5 | 292.2 | 925666.9 |
| WOOD OR FOREST LAND | | Good | 601898.8 | 36672.5 | 4890.8 | 41687.3 | 24030999.5 |
| FARMSTEAD | | -- | 1737.0 | 58.5 | 11.1 | 4.9 | 108141.7 |
| ROADS | Dirt | -- | 11684.8 | 852.5 | 291.8 | 502.2 | 981287.0 |
| | Hard Surfac | -- | 7758.7 | 404.8 | 110.3 | 146.6 | 631557.9 |
| IMPERVIOUS SURFACE | | -- | 15.1 | 2.4 | 0.2 | 4773.2 | 479098.5 |
| OPEN WATER | | -- | 7726.9 | 649.6 | 12.2 | 68.7 | 845750.7 |
| SWAMP (vegetated) | | -- | 17914.0 | 964.1 | 33.6 | 3557.3 | 1752586.9 |
| LOW DENSITY RESIDENTIAL | | -- | 17644.5 | 1697.6 | 641.2 | 552.7 | 1033683.7 |

Product Total= 31783486.7
Area Total= 814697.425
AMC II Weighted Runoff Curve Number 39
AMC I Weighted Runoff Curve Number 21.5

NOTES: Product = Acres x RCN factor from FIG. 7
RCN factor for FOREST class from FIG. 8

FIG. 6

| COVER | PRACTICE | CONDITION | ACRES | CURVE NUMBER FOR AMC II | | | | PRODUCT |
|---|---|---|---|---|---|---|---|---|
| | | | | A SOILS | B SOILS | C SOILS | D SOILS | |
| FALLOW | St Row | -- | | 77 | 86 | 91 | 94 | |
| ROW CROPS | St Row | Poor | | 72 | 81 | 88 | 91 | |
| | St Row | Good | | 67 | 78 | 85 | 89 | |
| | St Row | Mulch Till | | 61 | 76 | 84 | 87 | |
| | Contoured | Poor | | 70 | 79 | 84 | 88 | |
| | Contoured | Good | | 65 | 75 | 82 | 86 | |
| | Contoured | Mulch Till | | 62 | 73 | 80 | 85 | |
| | C & T | Poor | | 66 | 74 | 80 | 82 | |
| | C & T | Good | | 62 | 71 | 78 | 81 | |
| | C & T | Mulch Till | | 61 | 70 | 77 | 80 | |
| SMALL GRAINS | St Row | Poor | | 65 | 76 | 84 | 88 | |
| | St Row | Good | | 63 | 75 | 83 | 87 | |
| | St Row | Mulch Till | | 58 | 74 | 82 | 86 | |
| | Contoured | Poor | | 63 | 74 | 82 | 85 | |
| | Contoured | Good | | 61 | 73 | 81 | 84 | |
| | Contoured | Mulch Till | | 59 | 72 | 80 | 83 | |
| | C & T | Poor | | 61 | 72 | 79 | 82 | |
| | C & T | Good | | 59 | 70 | 78 | 81 | |
| | C & T | Mulch Till | | 58 | 69 | 77 | 80 | |
| LEGUMES OR ROTATION MEADOW | St Row | Poor | | 66 | 77 | 85 | 89 | |
| | St Row | Good | | 58 | 72 | 81 | 85 | |
| | Contoured | Poor | | 64 | 75 | 83 | 85 | |
| | Contoured | Good | | 55 | 69 | 78 | 83 | |
| | C & T | Poor | | 63 | 73 | 80 | 83 | |
| | C & T | Good | | 51 | 67 | 76 | 80 | |
| PASTURE | | Good | | 68 | 79 | 86 | 89 | |
| | | Poor | | 49 | 69 | 79 | 84 | |
| | | Fair | | 39 | 61 | 74 | 80 | |
| MEADOW (permanent) | | Good | | 30 | 58 | 71 | 78 | |
| WOOD OR FOREST LAND | | Poor | | 45 | 66 | 77 | 83 | |
| | | Fair | | 36 | 60 | 73 | 79 | |
| | | Good | | 25 | 55 | 70 | 77 | |
| FARMSTEAD | | -- | | 59 | 74 | 82 | 86 | |
| ROADS | Dirt | -- | | 72 | 82 | 87 | 89 | |
| | Hard Surface | -- | | 74 | 84 | 90 | 92 | |
| IMPERVIOUS SURFACE | | -- | | 100 | 100 | 100 | 100 | |
| OPEN WATER | | -- | | 100 | 100 | 100 | 100 | |
| SWAMP (open water) | | -- | | 85 | 85 | 85 | 85 | |
| SWAMP (vegetated) | | -- | | 78 | 78 | 78 | 78 | |
| LOW DENSITY RESIDENTIAL | | -- | | 47 | 65 | 76 | 82 | |
| MID DENSITY RESIDENTIAL | | -- | | 54 | 70 | 79 | 84 | |
| HIGH DENSITY RESIDENTIAL | | -- | | 70 | 81 | 87 | 90 | |
| COMMERCIAL & INDUSTRIAL | | -- | | 86 | 91 | 93 | 94 | |

FIG. 7

Distinct Signatures

Signature Overlap

METHOD AND APPARATUS FOR DETERMINING RUNOFF USING REMOTE GEOGRAPHIC SENSING

BACKGROUND OF THE INVENTION

1. Field of the Invention

The invention relates generally to a system for studying the interaction between rainfall and the potential for fluid runoff in a selected geographic region such as a river basin. The invention further relates to a method for obtaining digital data relating to ground cover and soil type classifications in selected geographic regions using remote sensing techniques.

2. Description of the Related Art

The interaction of rainfall and the potential for fluid runoff is an important consideration for the development and management of geographic sites such as river basins and, in particular, in the construction and operation of such structures as dams and hydroelectric plants. The accurate estimation of flooding potential in a basin is necessary for the proper design of plant components such as dams, spillways and reservoirs and for their proper operation in retaining water in designated areas. Further, the extent to which the soil at a geographic site can absorb water and other fluids is an important consideration for such applications as the installation of reservoirs for recreation and drainage fields for waste water treatment systems.

The extent to which hazardous, and sometimes life-threatening, flooding can occur in a river basin, or more simply the degree to which basin soils are infiltrated by a fluid, is generally estimated using mathematical models and various kinds of data obtained from aerial photographs and actual field trips to various basin areas. A commonly used standard for estimating fluid runoff potential is probable maximum flood (PMF) determination in accordance with a methodology established by the United States Soil Conservation Service. This standard is generally used as a guideline for the safe operation of dams by governmental agencies such as the Federal Energy Regulatory Commission (FERC).

PMF calculations require the determination such parameters as the probable maximum precipitation (PMP) that is likely to occur over a basin and the runoff curve number (RCN) for the basin. Generally, the RCN of a drainage basin provides an indication of its runoff potential and is based on the ground cover within the basin and the hydrologic soil group (HSG) classifications for the soils in the basin. Ground cover generally corresponds to the different classes of land use such as forest, fallow land, and residential and/or commercial development which exist in the area under study. HSG classifications for soil are generally based on the extent of infiltration and transmission of water through the soil and transmission of the water. The United States Soil Conservation Service (SCS) developed the HSG classification system to identify a soil sample as belonging to one of four different classes. The classes, as defined by the SCS, include class A (for soils such as sands and gravels which have high water infiltration rates even when thoroughly wetted and high rates of water transmission), classes B and C (for soils such as silts which are characterized by moderate to slow water infiltration rates when thoroughly wetted and moderate to slow water transmission rates), and class D (for soils such as clays which have very slow water infiltration rates when thoroughly wetted and very slow water transmission rates).

PMF values may have in the past been subject to considerable inaccuracy due to the imprecise methodology used for calculating RCN values. In order to calculate RCN values, the number of acres of each ground cover type and each hydrologic soil combination have to be determined. In the past, data relating to ground covers and soil types have been obtained from regional soils association maps and area specific soil series survey maps prepared by the United States Soil Conservation Service, and quadrangle, soils and geology maps such as those developed by the United States Geological Survey. Many of these sources are outdated, reflecting in many instances the status of the geographic area under study decades removed in time from the current study. Further, many of these sources do not account for the high degree of variability that may exist soil types over short distances, as only relatively sparse soil sampling was undertaken for many of the mapping endeavors.

Several additional drawbacks with respect to previous methods for calculating RCN values are attributable to the manner in which the number of acres for each ground cover/soil type combination in the basin is determined. In the past, mylar sheets have been prepared in an effort to graphically indicate ground cover and soils classes for a prescribed geographic area. These sheets are generally overlaid with a geographical view of the basin which is usually obtained by enlarging one or more regional maps. A grid structure is superimposed over the mylar sheets and the regional map, and the grid squares are counted for each ground cover/soil group combination. The accuracy of this method is heavily dependent on the size of the grid squares chosen for the mylar overlays and the accuracy with which they are applied to the superimposed sheets. Further, substantial inaccuracies in the determination of acreage for each ground cover/soil type combination can arise from the manual estimates made by the human analyst when determining the percentage of a grid square occupied by a particular ground cover or soil type.

The scaling and alignment of the overlays and geographic maps can also contribute substantially to the inaccuracy of ground cover/soil type areal determinations. Scaling and alignment are generally performed manually by making approximate enlargements of maps representing adjacent geographic regions and attempting to align one map with respect to another map using landmarks shown on both of the maps. Errors in the original maps become more pronounced when the maps are enlarged. Further, the erroneous positioning of landmarks on the original maps can cause the areas surrounding the landmark coordinates to be erroneously displaced on the combined map, thereby providing inaccurate information about the soils and ground cover in the region of interest.

SUMMARY OF THE INVENTION

The present invention relates to a system for studying the interaction between rainfall and the potential for fluid runoff in a geographic region which avoids many of the deficiencies associated with previous methods for making rainfall-runoff determinations. In its broadest aspect, the system comprises the use of remote sensing apparatus for obtaining images of a selected geographic region. The images generally comprise binary data values which correspond to the level of radiation that is reflected from detected areas of the geographic region.

The system further comprises processing means for storing binary image data in digital memory, and for analyzing image data to ascertain the spectral reflectance patterns, that is, characteristic wavelengths of detected radiation, for various soil characteristics and ground covers of the imaged region.

In accordance with a further aspect of the present invention, a method is provided for using processing means to determine spectral reflectance patterns for various ground covers or soil types for selected image pixels which correspond to areas in the imaged region that can be identified, using other data sources such as field data and geological and soils series survey and association maps, as having a particular ground cover or soil type. Each image pixel is subsequently processed so as to be assigned a ground cover or soil type classification, for which the characteristic spectral reflectance pattern corresponds to the binary values associated with the pixel.

In accordance with a preferred embodiment of the present invention, image processing apparatus is provided which is operable to classify a first image in accordance with selected ground covers, to classify a second image in accordance with selected soil type classifications, such as hydrologic soil groups, and to combine the first and second images as a composite image in digital memory. Further, the image processing apparatus is operable to determine from the composite image the number of acres in the imaged region having each of the ground cover and soil type classification combinations. These acreage determinations can be subsequently used to determine, for example, the RCN and calculate a rainfall loss function in a computer watershed model to determine the PMF, or to generate basin hydrographs and design flood hydrographs in accordance with various precipitation events.

BRIEF DESCRIPTION OF THE DRAWINGS:

These and other features and advantages of the present invention will be more readily apprehended from the following detailed description when read in connection with the appended drawings, in which:

FIG. 6 is a table showing the calculation of a runoff curve number for an exemplary geographic region;

FIG. 7 is a table of standardized curve numbers for several hydrologic soil groups in different classes of ground cover;

Figure 1:
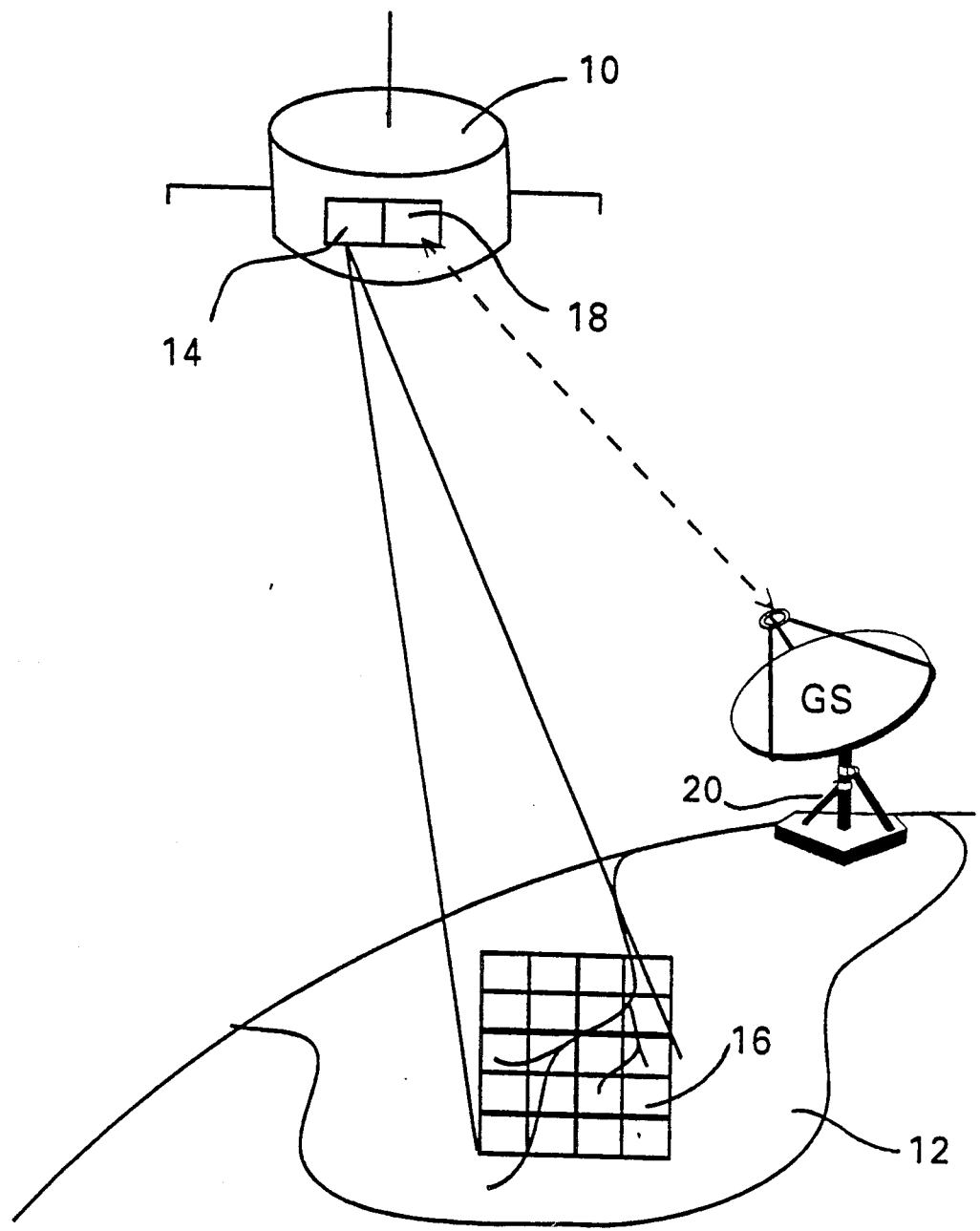
FIG. 1 depicts apparatus for remotely sensing a geographical area.

DETAILED DESCRIPTION OF THE PREFERRED EMBODIMENTS:

With reference to the drawings, wherein related reference characters represent like components throughout the various views, and with particular reference to FIG. 1, an orbiting satellite 10 is depicted as passing over a geographic region of interest such as a river basin 12 located along the satellite flight path. The satellite is generally provided with an on-board sensor system 14 for remotely detecting a discrete area 16 of the river basin 12 and a satellite processing system 18 for transmitting sensor output data from the satellite to a remote ground station 20. It is to be understood, however, that other types of remote sensing systems can be used in accordance with the present invention.

Figure 2:
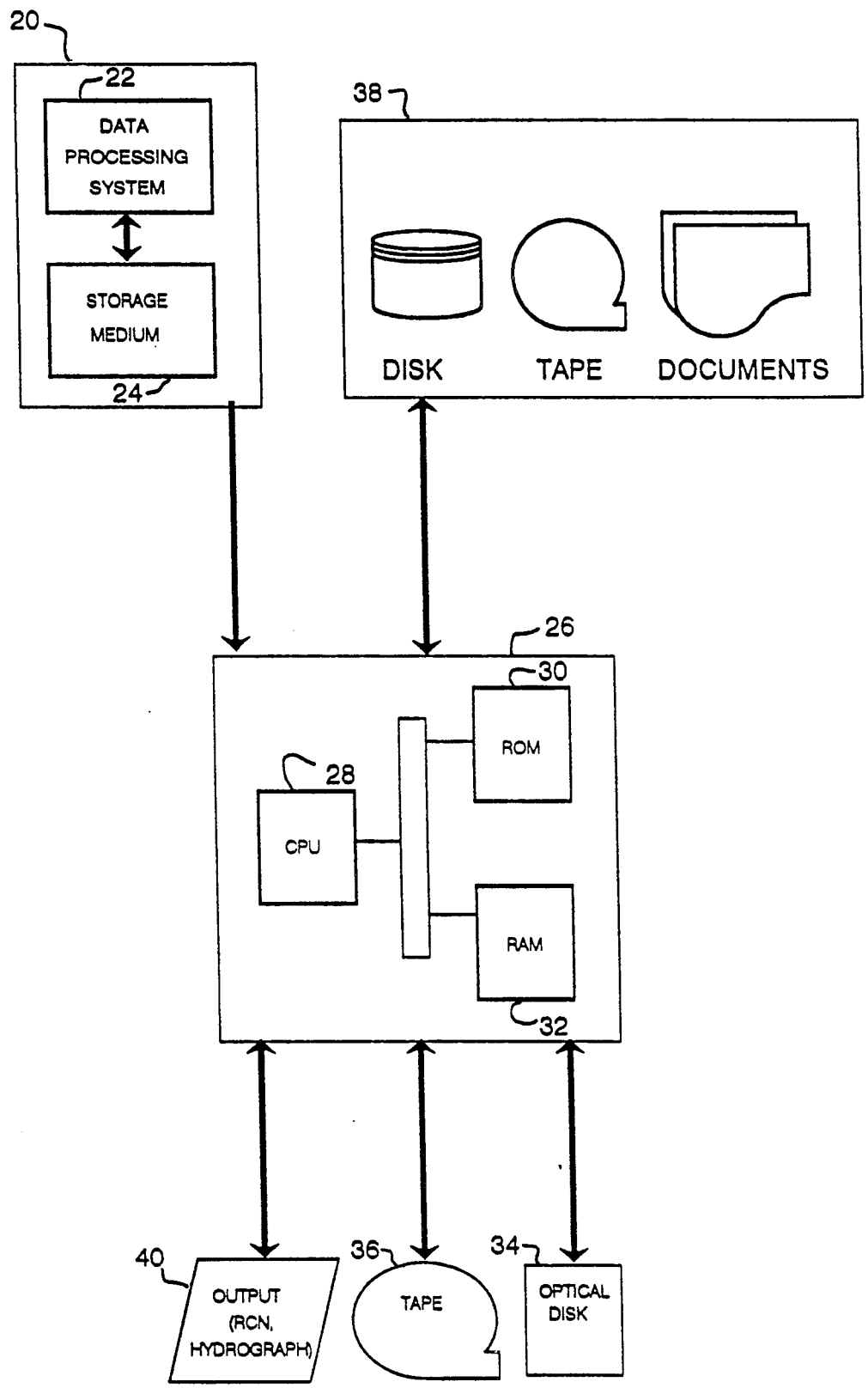
FIG. 2 is a schematic diagram of an exemplary image data processing system constructed in accordance with the present invention.

As shown in FIG. 2, the ground station 20 comprises a data processing system 22 for receiving data from remote sensors and for processing sensor output data so that it can be stored as image data on appropriate storage media 24 such as optical disks and magnetic tape. In accordance with the present invention, a computer 26 is provided to perform a variety of functions including image processing. The computer 26 is preferably in the form of an IBM model PC; however, other suitable processors, such as PC-compatible computers, workstations, microcomputers, minicomputers and mainframe computers, can be used. The computer 26 comprises a central processing unit (CPU) 28 and read-only memory (ROM) 30 for storing kernel software which controls basic computer operations such as powering up and down. Random access memory (RAM) 32 is provided for storing data and software programs for processing the data. The computer 26 is preferably provided with appropriate peripheral devices such as optical disks and tape drives 34 and 36 for receiving stored image data, among other types of data, and for applying such data as inputs to the computer 26 in a conventional manner.

The computer 26 is operable to process the image data for the basin 12 or other topographic feature of interest to analyze the interaction between rainfall and runoff in the basin 12. In addition to using image data from remote sensing platforms such as satellites, data from external sources 38 such as aerial photographs of the basin 12, field data, state and regional soils association and detailed soils series survey maps, and reports prepared by local and federal government agencies such as the United States Soil Conservation Service, and the United States Geological Survey, can be processed in the manner described below in connection with the analysis of remotely sensed data. As will be described in further detail below in connection with FIG. 12, the computer is operable to process data from these external data sources 38 and the remote sensor system 10 to generate output data 40. Typically, the output data will include the fluid runoff curve number (RCN) and probable maximum flood (PMF) of the basin 12, as well as basin hydrograph and design flood hydrographs corresponding to historical and projected rainfall events. A hydrograph is generally a time series representation of water volume per unit time at a particular geographic point.

Figure 3:
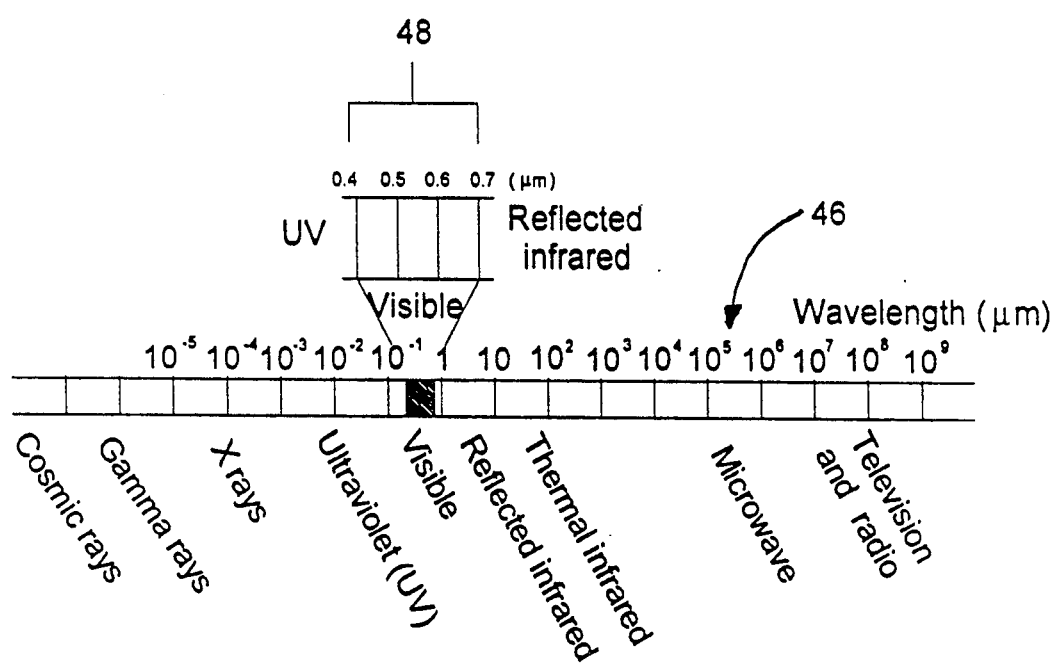
FIG. 3 illustrates wavebands of the electromagnetic spectrum.

The sensor system 14 of FIG. 1 preferably comprises a plurality of sensors that are operable to detect electromagnetic radiation reflected from the surface of the geographic region under study. FIG. 3 illustrates the wavelength bands associated with the electromagnetic spectrum 46 and an enlarged view of bands 48 in the visible and infrared wavelength portion of the spectrum 46. The detection of reflected energy in the infrared as well as visible portions of the electromagnetic spectrum is particularly important in remote sensing applications involving resource discrimination, as many Earth resources reflect unique amounts of radiation in separate wavelength bands in this portion of the spectrum. For example, while both deciduous maple and coniferous pine trees reflect similar amounts of energy in the visible portion of the electromagnetic spectrum and therefore appear to be virtually indistinguishable from one another on the basis of their color, each variety of tree has a uniquely characteristic spectral reflection pattern in the infrared portion of the spectrum, thereby rendering them quite distinguishable from one another. Thus, the broader the portion of the electromagnetic spectrum that can be detected or sensed (i.e., the greater the number of wavelengths or wavelength bands that can be detected), the more easy Earth resources discrimination can become. Several remote sensing systems are currently in use for Earth observation, including, among other systems, LANDSAT, a satellite system developed by the United States, and SPOT, a European satellite system. LANDSAT comprises a sensor system which is capable of detecting three visible wavelength bands (blue, green and red), as well as two near infrared bands, a far infrared band and a thermal infrared band and is therefore particularly useful in analyzing land masses.

The sensor system 14 generally comprises a plurality of sensors for detecting selected wavelengths of radiation reflected from a particular geographic area. For example, LANDSAT comprises sensors for detecting, respectively, one of seven different wavelengths of radiation. Sensors for each wavelength are generally arranged in a grid-like configuration and positioned on a platform so as to be elevated above a selected geographic area to detect radiation reflected from corresponding grid-like parcels of the geographic area. The sensor output for each of the sensors can be compiled as image data which comprises a series of binary values for each picture element or pixel in the image. The binary values represent a spectral response pattern comprising the respective levels of radiation detected by the sensors in each wavelength band.

Figure 4:
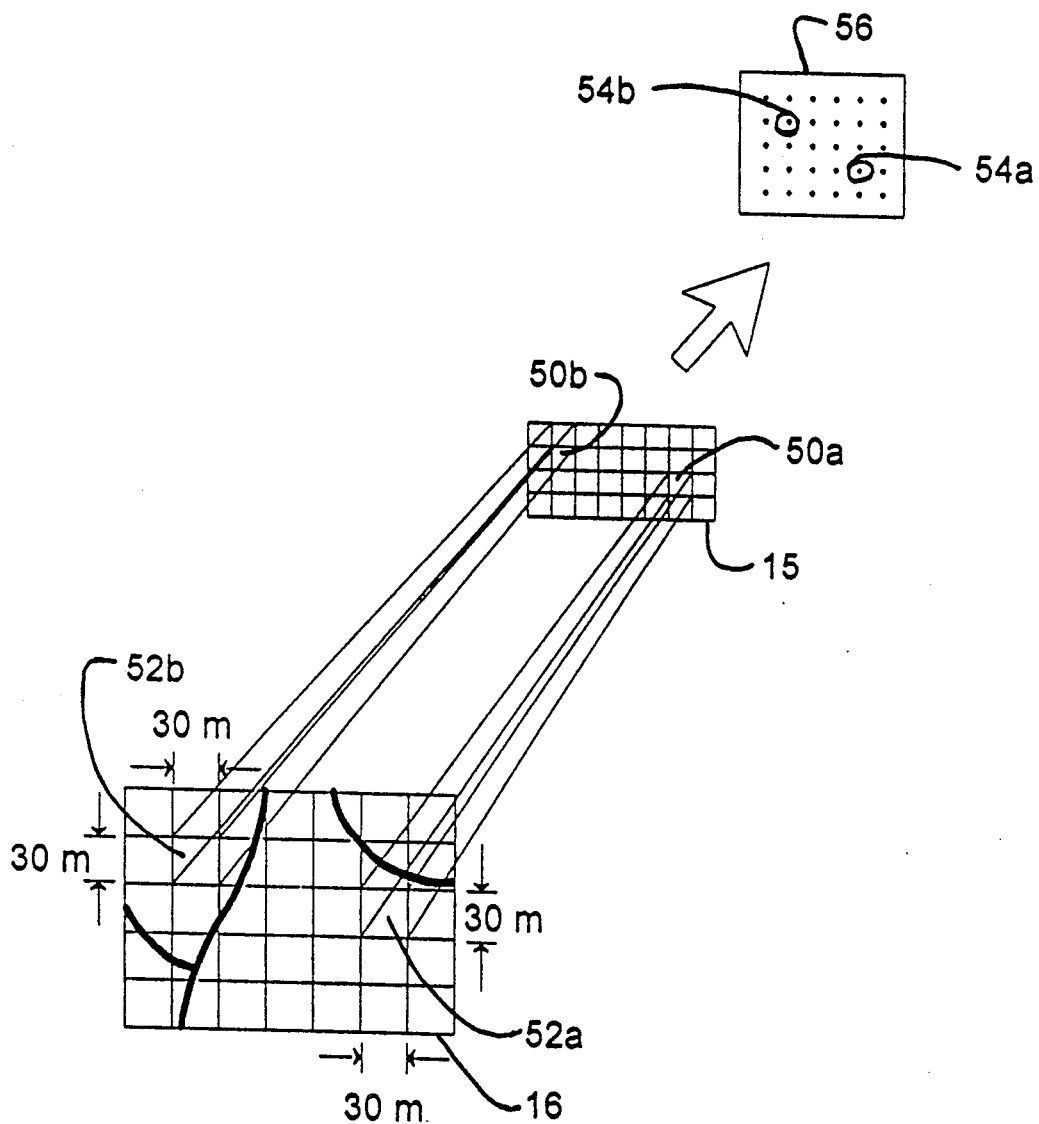
FIG. 4 depicts the relationship of image pixels to geographic areas detected by the remote sensing apparatus.

FIG. 4 is an illustration of an instrument 15 associated with the sensor system 14 which is operable to detect a wavelength band of radiation and which comprises a plurality of individual sensors 50 in a geometrical or matrix-like arrangement. Two individual sensors are labeled as 50a and 50b, respectively. The individual sensors can be characterized by, among other features, their respective spatial resolutions. For example, if the sensors 50 have a spatial resolution of 30 meters, the sensors 50a and 50b are operable to detect radiation reflected from corresponding 30×30 meters square areas 52a and 52b in the detected basin area 16.

Figure 5:
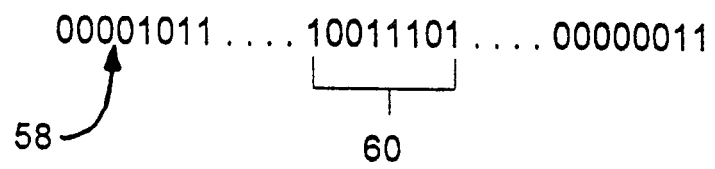
FIG. 5 illustrates a data signal transmitted from the remote sensing apparatus.

The radiation levels detected by each of the sensors 50 is generally assigned a binary number by the satellite processing system 18. Thus, in an imaging system that has an 8-bit radiometric resolution, reflected radiation from the ground can be represented as one of $2^8$ or 256 discrete levels of radiation. Accordingly, the processing system 18 of FIG. 1 analyzes sensor output data and generates appropriate binary numbers 58 (e. g., binary values between 0 and 255) for the sensors, and transmits these binary numbers 58 as a part of a data signal 60, as shown in FIG. 5, to the ground station 20. The ground station processing system 22 (FIG. 2) typically receives several million data signals 60 in sequence and stores the transmitted binary numbers collectively as a digital image of the detected basin area 16 on the storage medium 24 in a manner which maintains substantially the correspondence between the binary numbers and the geographical site or locale they represent. Accordingly, the binary numbers can be properly associated with corresponding pixels which constitute the image. With further reference to FIG. 4, the binary values that represent the amount of radiation reflected in each wavelength from land parcels 52a and 52b and detected by sensors 50a and 50b are stored in digital memory as part of the spectral response patterns represented by pixels 54a and 54b, respectively, in the image 56.

Figure 8:
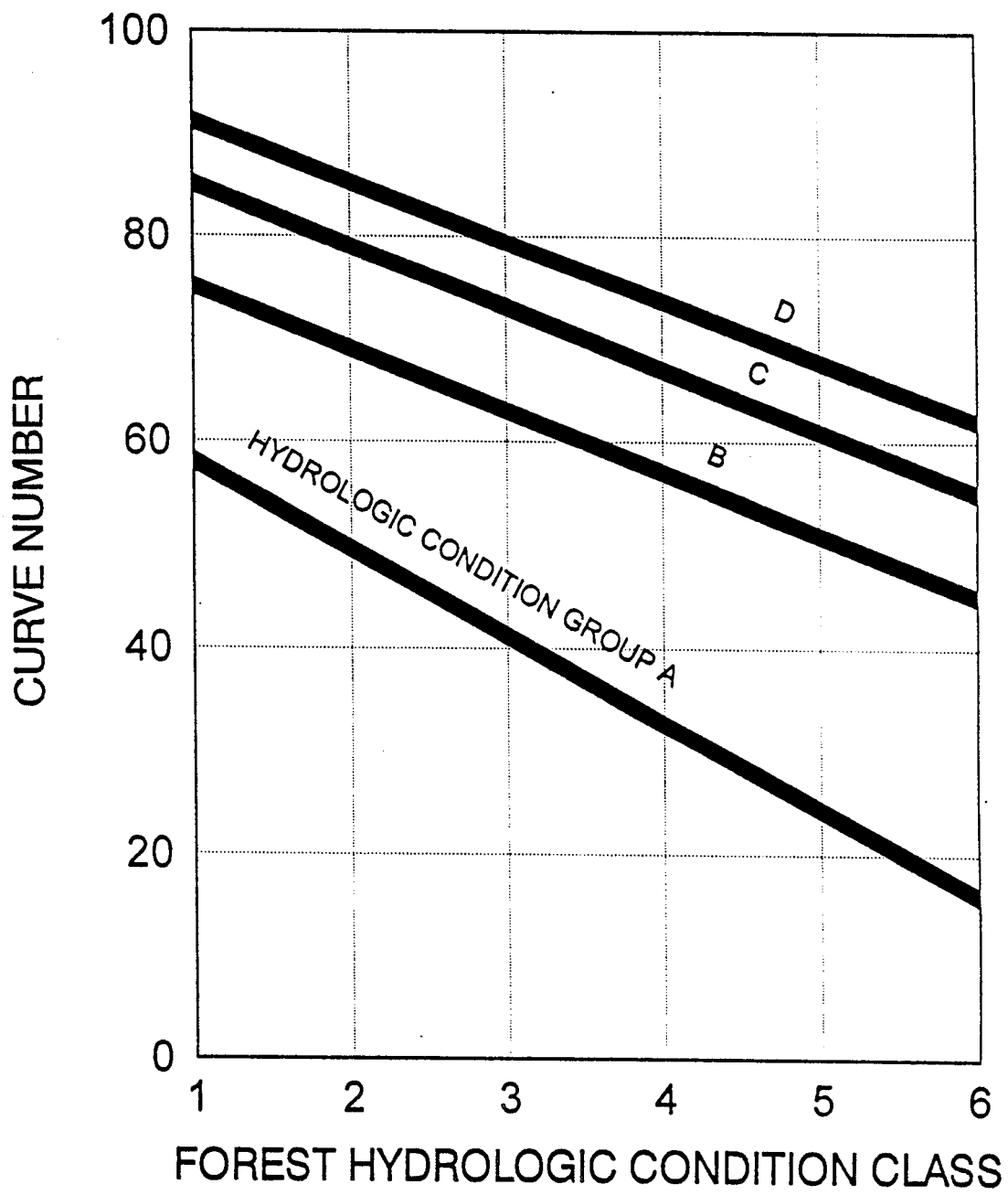
FIG. 8 is a graph of curve numbers for hydrologic soil groups in a ground cover class.
Figure 9A:
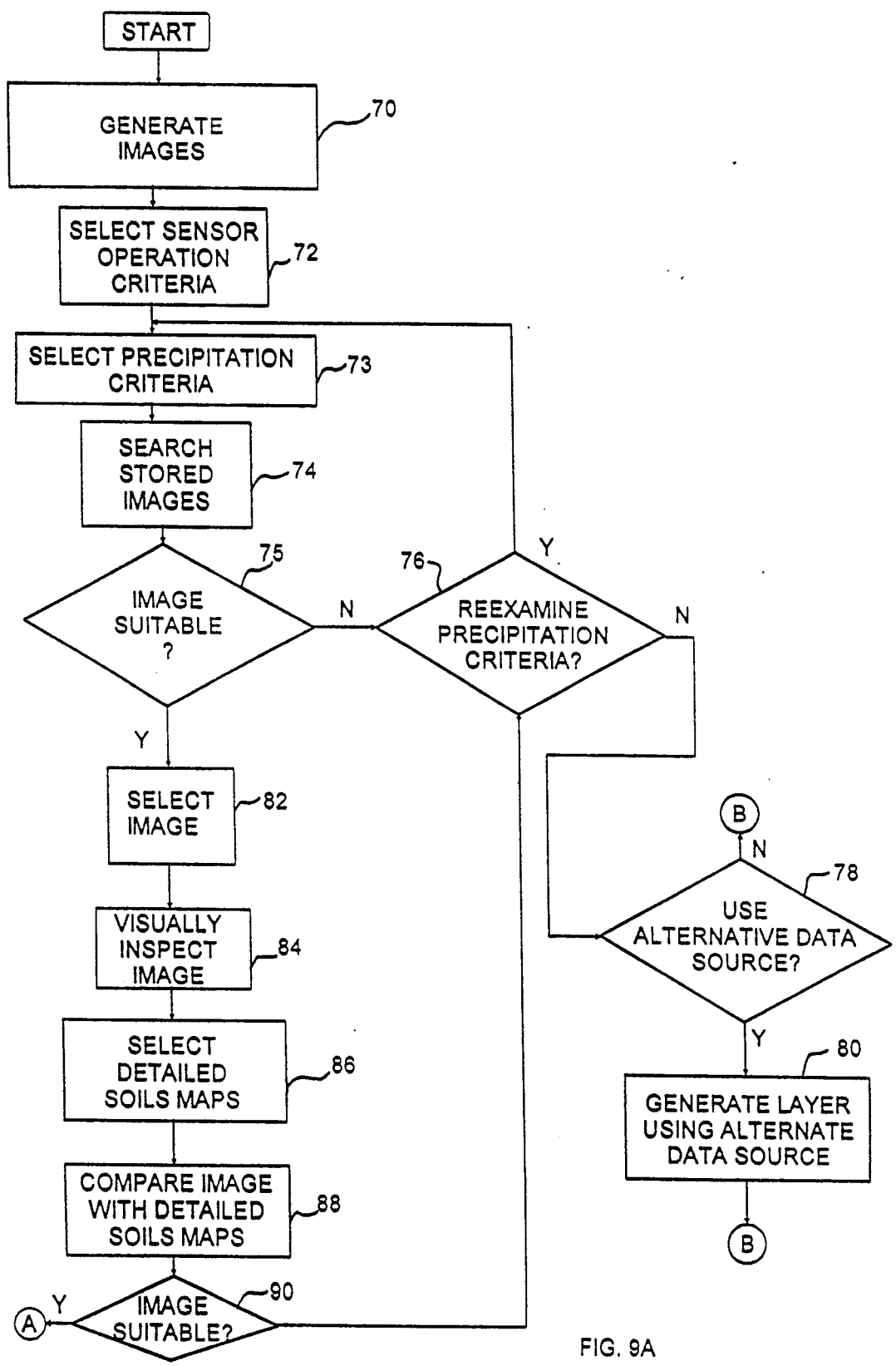
FIGS. 9A and 9B are flow charts depicting a sequence of operations for classifying image data to determine one or more soil characteristics.
Figure 9B:
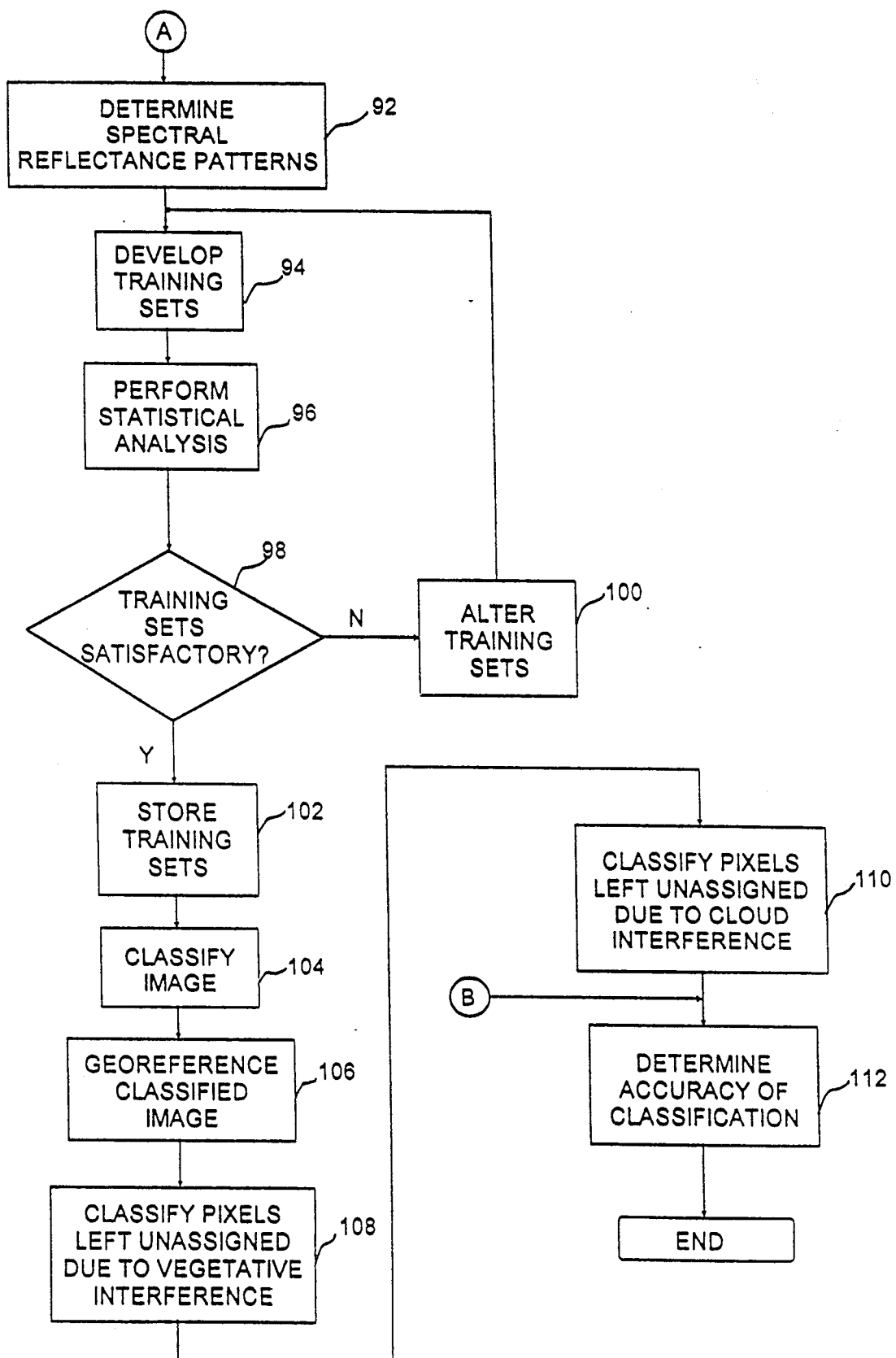
Figure 11A:
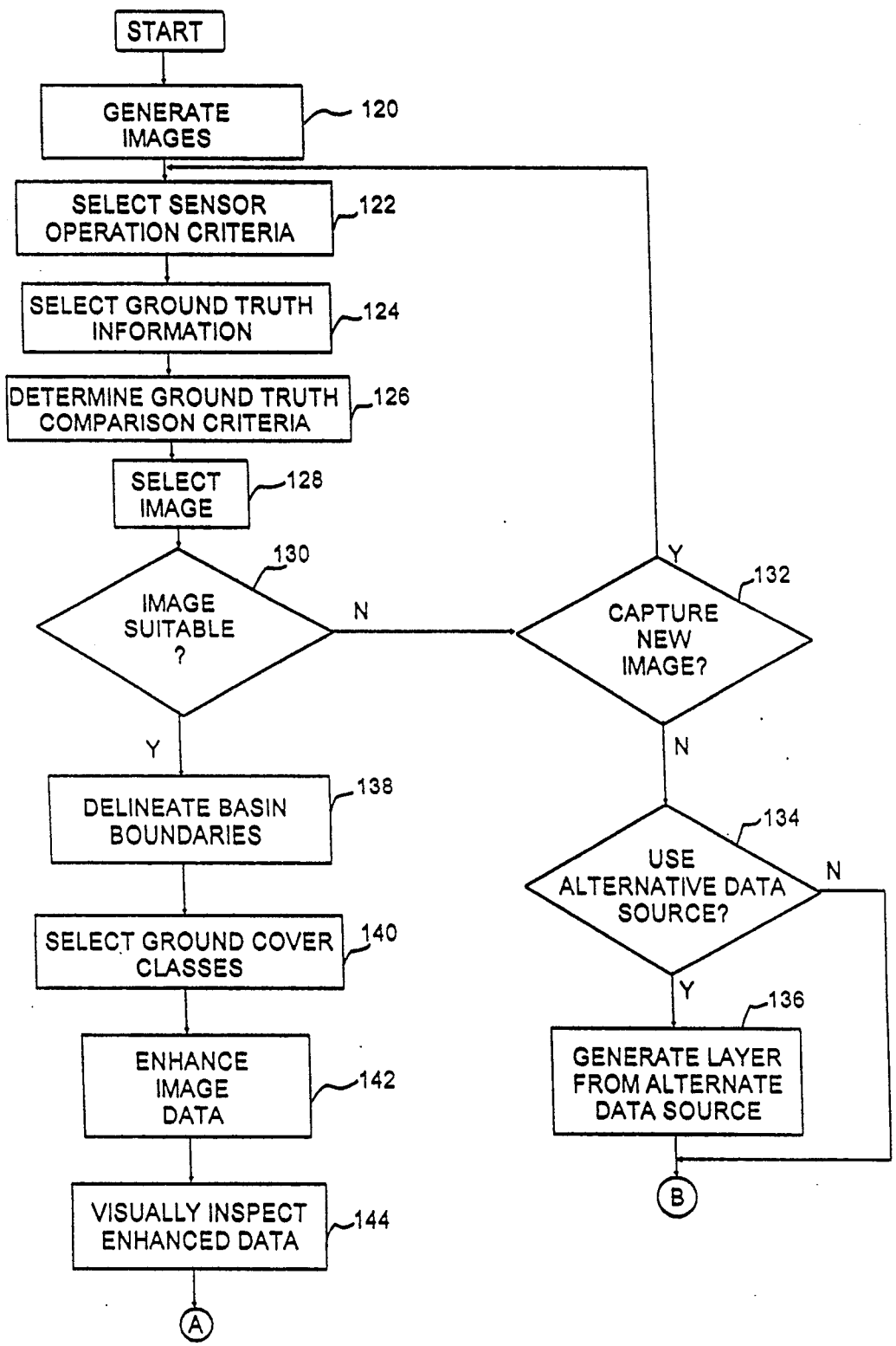
FIGS. 11A and 11B are flow charts depicting a sequence of operations for classifying image data to determine ground cover type.
Figure 11B:
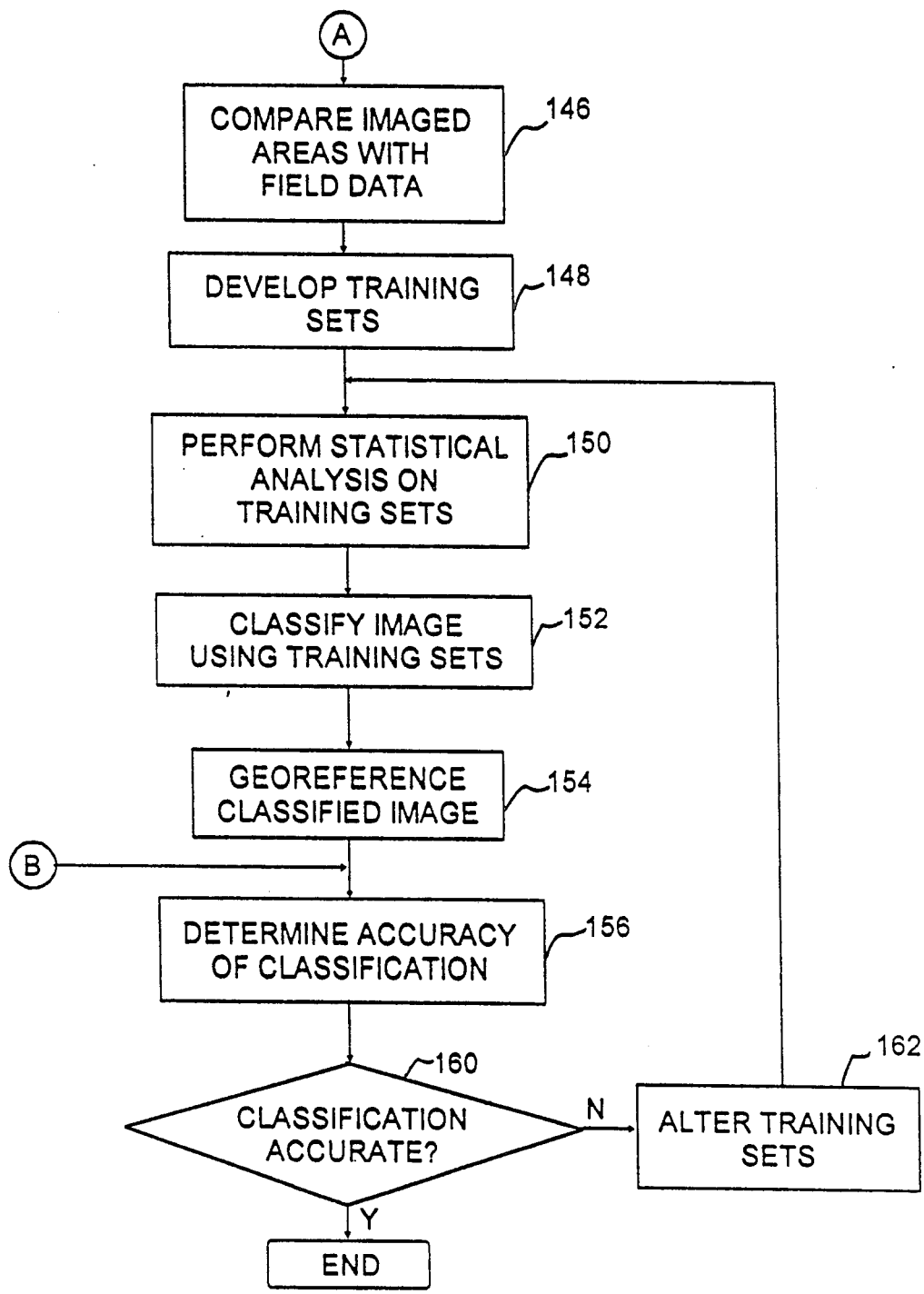

In accordance with one aspect of the invention, the image data recorded on the storage medium 24 is processed in a manner described below in connection with FIGS. 9 and 11 to obtain the relevant components for accurate determination of the RCN for the basin, namely, the ground cover and the HSG classifications of the soil in the basin 12. It is to be understood, however, that the provision of a greater or lesser number of classifications, or the use of an altogether different classification scheme or analysis, is encompassed by the present invention. In accordance with the methodology developed by the United States Soil Conservation Service (SCS), the RCN for the basin is calculated by determining the number of acres of each different ground cover type and HSG combination that exist in the basin 12. FIG. 6 illustrates the tabulation of each ground cover and HSG combination found in an exemplary basin. The RCN tabulation can be performed manually, such as by counting appropriate squares on mylar overlays of ground cover and soil data; however, computer processing of remotely sensed data in addition to data obtained manually in accordance with the present invention allows for more accurate tabulation in substantially less time. With reference to the leftmost vertical column of the table, the SCS classifications for various ground covers are listed. For each type of cover, a determination is made by the computer 26 as to the number of acres in the basin that are characterized as belonging to each of the four specific HSG classes, and the acreage is indicated, accordingly, in the appropriate columns for A, B, C, or D soils next to the ground cover type entry. The numbers in the rightmost column of the table labeled "PRODUCT" are calculated by multiplying the acreage in each of the soil class columns for each ground cover type by a runoff curve number factor obtained from a table shown in FIG. 7 or from a graph shown in FIG. 8 which is for national and commercial forest ground covers. The entries in the "PRODUCT" column are subsequently added together and the sum is then divided by the total acreage of the basin to obtain a number which is the RCN for the basin, as indicated at the bottom of the table.

RCN determination generally involves consideration of another factor, and that is the effect of antecedent weather conditions on the infiltration capacity of the soil. SCS uses criteria for three Antecedent Moisture Condition (AMC) Classes, the names of which are abbreviated as AMC I, AMC II and AMC III, in connection with the RCN methodology. The AMC classes are described in *The Handbook of Applied Hydrology: A Compendium of Water Resources Technology*, edited by Ven te Chow and published by McGraw Hill, 1964. The standard assumption (AMC II) is that the preceding five-day rainfall is between 1.4 and 2.1 inches (3.5 cm and 5.3 cm) during the summer growing season and between 0.5 and 1.1 inches (1.25 cm and 2.8 cm) during the dormant season. The RCN value is adjusted to a corresponding AMC III value when the antecedent rainfall exceeds these AMC II criteria and is adjusted to a corresponding AMC I value when the antecedent rainfall is less than the AMC II criteria. The table shown in FIG. 6 shows two RCN values that are adjusted to respective AMC I and AMC II values, as it may be determined that one or the other AMC value is appropriate for a particular analysis.

The tabulation of standard runoff curve numbers will now be described in connection with FIGS. 7 and 8. The runoff curve numbers described in connection with FIG. 6 are tabulated in FIG. 7. As the table indicates, an RCN value is provided in the appropriate columns for each HSG class next to each ground cover entry in the leftmost column. While the ground covers can be classified in a variety of ways, the ground cover classes listed in FIG. 7 have been selected by SCS for use in the determination of the RCN of a study area using the SCS methodology.

The majority of the values for each ground cover/HSG combination in FIG. 7 are generally obtained from empirical data gathered by SCS. The values for national and commercial forest ground cover, however, can be obtained from a graph depicted in FIG. 8, which can be found in a handbook entitled *National Engineering Handbook*, section 4, Hydrology, published by the Soil Conservation Service branch of the United States Department of Agriculture in 1969. The curves shown in the graph of FIG. 8 are used to obtain the runoff curve number for geographic areas covered with managed forests such national and commercial forests as opposed to natural forests. The RCN for managed forest land can differ from natural forest land because of the deliberate spacing of trees in a managed forest among other reasons.

With further reference to FIG. 7, the curve numbers range in value from 1 to 100, where 100 represents a surface such as standing water that is essentially impervious to water. As the table indicates, row crops are generally less impervious to water than is an open water swamp, and a class D soil for a ground cover area such as a meadow is more impervious than a class A soil within the same area.

As previously discussed, the process of tabulating runoff curve numbers (RCNs) for each ground cover and HSG combination in the basin to calculate the RCN for the basin is substantially simplified using remotely sensed, digital image data. Remote sensing of the geographic area under study provides a substantial amount of data relating to ground cover and soil classifications, among other land features and soil characteristics, while avoiding labor intensive field surveys to obtain field survey data, soil samples, photographs and other forms of data for classification purposes and for the determination of the study area boundaries. The use of remotely sensed data obtained from sensors with high spatial resolution provides for more accurate RCN determination, as the various ground covers and soil types that exist in the study area can be determined over shorter distances generally in less time and at lower cost than by field surveys. This is particularly true for study areas that are not accessible by field surveyors on foot. Further, the acreage of each ground cover and HSG combination can be more accurately delineated by computer processing of digital sensor data, as manual estimates of the acreage using a grid interposed on mylar overlays is avoided. Using computer processing of digital images to determine study area boundaries and boundaries associated with different ground cover and soil classes as opposed to survey data and various maps also contributes to more accurate RCN determinations.

As will be described in more detail below, sensor data associated with specific ground cover and soil types can be further processed into one or more selected land characteristics. Computer processing of digital data can be implemented on the computer 26 by using one or more commercially available software programs to analyze image data which has been down-loaded from the ground station storage medium 24 to, for example, the tape drive 36.

Several commercially available image processing system (IPS) software programs can be used to analyze a digital image of a geographic region to identify selected land features. For example, ERDAS, which is a commercially available IPS software program developed by ERDAS, Inc. of Atlanta, Ga., can be run on the computer 26 to provide a user with the necessary analytical tools to review stored image data and to determine relationships between the binary numbers associated with image pixels and the spectral reflectance patterns associated with a desired land feature. Further, the ERDAS IPS software provides analytical tools for analyzing the image data to identify pixels exhibiting various spectral reflectance patterns of interest to the user.

In accordance with one aspect of the present invention, IPS software is used with the computer 26 to analyze each pixel in a selected basin image in accordance with preestablished criteria in order to classify the pixel as belonging to a particular ground cover classification and a particular HSG classification. The ground cover and HSG classifications for each pixel can be stored in, for example, the optical disk 34 and subsequently processed by a Geographic Information System (GIS) software program. As with IPS software, there are several commercially available GIS programs, such as ERDAS GIS software and ARC/INFO developed by the Environmental Systems Research Institute, Inc. of Redlands, Calif., that are suitable for use in the present invention. Generally, the GIS program allows a user to electronically overlay and store several images of a geographic region depicting different kinds of data in a database and to investigate the interrelationships between these factors by querying the database. For example, data relating to soil type, land use, land ownership, visibility and purchase price could be processed by the GIS software into appropriate superimposable layers to generate a composite map for a land use suitability study.

In accordance with the present invention, a GIS program is used to electronically overlay a layer of data which details the land cover or use in the basin with a second layer delineating the HSG of the underlying soil. Under control of the GIS program, the computer 26 is operable to tabulate the ground cover and HSG classification data corresponding to each pixel in the basin image and to integrate the classification data to form a composite image or GIS layer. The GIS layer is electronically stored in, for example, the optical disk, as an intelligent database. Further, the GIS program provides the computer with analytical tools to allow a user to query the database to determine, for example, very precisely the number of acres of each ground cover or soil type, or combination of the two, that are depicted in the GIS layer based upon data that has been collected, processed and organized in accordance with the principles of the present invention.

The manner in which HSG classifications are determined for the basin soils will now be described with reference to FIG. 9. As shown in block 70, the first step in the process is to generate digital images of various geographic regions using a remote sensing system 10 such as satellite, which can be stored as digital data in a storage medium 24. These images preferably constitute a data which can be visually inspected, for example, to select one or more images for further processing by the computer 26.

Several aspects of the remote sensing system 10 are generally considered in order to obtain a suitable image for a soils study. Perhaps the most important aspect of the sensing system is the spectral resolution of the sensors. To distinguish soils with different HSG classifications, the sensor data must allow for the identification of basin areas having different soil moisture content. As between the two presently commercially available satellite remote sensing systems, LANDSAT is preferred over SPOT due to LANDSAT sensor system's ability to detect reflected radiation in three visible bands, three reflected infrared bands and a thermal infrared band. The infrared wavelengths comprising these reflected bands are relatively long as compared to visible radiation wavelengths and are, therefore, predominantly absorbed rather than reflected by water. LANDSAT is operable to generate seven bands of reflectance data, referred to simply as bands 1, 2, 3, 4, 5, 6 and 7. Depending on the objectives of the image data analysis, various combinations of two or more wavelength bands can be used to study land characteristics. For example, the combination of LANDSAT 4, 5, 3 bands has been found, along with other band combinations, to be particularly effective for displaying areas of soil moisture. In these wavelength bands, wet areas manifest themselves as dark regions on a monitor or in a photograph, whereas drier areas appear as lighter regions.

Another criterion for generating a suitable basin image is the spatial resolution of the sensing system. For example, LANDSAT sensors have a spatial resolution of 30×30 meters square and generally operate collectively to generate an image of 115×115 miles square (~19,000 km$^2$) geographic area. If the basin area is larger than the sensing system image size, several different images captured by an orbiting sensor system can be combined to image the entire area in most remote sensing applications. Images captured on different satellite passes of the basin, however, may not necessarily reflect the same rainfall conditions, as the passes may be too remote in time from one another. Images that are combined to form an image of the entire area can be processed to compensate for differences attributable to, for example, atmospheric conditions.

With reference to block 72, sensor operation criteria can be considered to obtain a suitable image for a soils study. The time of year when image capture occurs is an important criterion for generating a suitable image for an HSG study. The image is preferably obtained when there is little interference to viewing the soil. Soil study images of the basin 12 are preferably captured when the amount of snow on the ground is at a minimum, the litter cover is minimal due to decomposition during the winter, and the growth of crops, meadows, forests and pasture vegetation is also at a minimum. Thus, it is preferable to capture images for most geographic regions during their respective months of spring.

As shown in block 73, precipitation criteria for the basin are also considered. These criteria include the occurrence of a significant and uniform rainfall over most of the basin land area at predetermined time interval prior to image capture. In order to remotely sense soils data, a rainfall event is necessary to expose the basin soil to a nearly uniform, sufficient amount of moisture so as to make the differences between the spectral reflectance patterns of the soils in each of the HSG classes ascertainable from the image data. If the rainfall is not uniform, the results of HSG classifications in one section of the basin will not correspond to similar classifications of soils in other basin areas. Further, the time period between the rainfall event and image capture must be short enough to allow for the imaging of moisture conditions in the soils having the highest infiltration rate, and long enough to allow for the cloud coverage to dissipate. For example, a rainfall event that occurs two or three days before image capture may satisfy these temporal requirements for imaging a basin consisting mostly of sandy soils which have a high infiltration rate.

With further reference to block 73, meteorological records for the imaged basin are examined to determine the dates of rainfall events that meet the above precipitation criteria. Alternatively, the sensing satellite can be commanded to obtain remotely sensed data from a geographic area of interest at a prescribed time relative to a recent meteorological event such as a rainfall or snowfall. Generally, precipitation records of the basin, which are included with the other data sources '38 provided to the computer 26 in FIG. 2, are obtained from weather stations located within the basin. Climatological reports prepared by organizations such as the U.S. National Oceanic and Atmospheric Administration (NOAA) can be consulted to obtain maps which show region-wide distributions of weather stations. The precipitation records generated by the weather stations located in the basin are generally examined along with the history of the stations to ensure the accuracy of measurements taken, that is, to ensure that the weather stations were not moved, and that the weather station instruments were working properly without interruption to their operation. The precipitation data can also comprise detailed hydrometeorology studies relating to historical storms, weather dynamics and precipitation patterns in the basin. For example, if it is determined the majority of the storms in the basin originate north of the basin 12, then it can be advantageous to consider the records of weather stations northeast or northwest of the basin.

Once the relevant rainfall event dates are selected, the computer 26 begins to tabulate the image data stored on the storage medium 24 in accordance with pre-established criteria, and preferably selects several images which were captured on or near the selected rainfall event dates, as shown in block 74. In addition to rainfall event dates, the computer 26 is also preferably provided with pertinent supplemental environmental data relating to soil temperatures, snow depth, and maximum and minimum daily atmospheric temperatures, all of which is included with the other data sources 38. Use of this supplemental data is desirable because the soils of different hydrologic soil groups cannot be accurately distinguished if the ground is covered with snow or simply frozen, and both of these conditions can exist during the spring months in many parts of the world.

With reference to decision block 75, the images in the database are preferably visually examined to select ones which generally satisfy the sensor operation and precipitation criteria discussed with reference to blocks 72 and 73. If the image appears to be inaccurate due to insufficient correlation with precipitation criteria (i.e., insufficient ability to discriminate between various soil groups), it may be desirable to alter the precipitation criteria, as indicated by the negative branch of decision block 75. As indicated by the affirmative branch of decision block 76, the precipitation records can be reexamined to find dates of rainfall events that occurred earlier or later in the months originally established as constituting spring for the purposes of the soil study. Further, the precipitation records can be reexamined to find additional rainfall event dates which occurred before image capture by an amount of time which exceeds the time period that was originally thought to be required for successful imaging of moisture conditions following a rainfall. If the images that have been captured are not suitable despite changes in precipitation requirements, then it may be necessary to manually generate a soils image using other sources 38 such as regional soils association maps and field survey data, as indicated by blocks 78 and 80. However, manually-generated images which are not created using remote sensing techniques are subject to considerable inaccuracy, as previously discussed, since the sources from which such images are compiled are frequently outdated and inaccurate due to human error in data recordation, data compiling, map scaling, and geographic boundary determination.

With reference to the affirmative branch of decision block 75, the satellite images selected in block 74 are subsequently analyzed to select the most optimal image to obtain HSG classification data, as indicated in block 82. As shown in block 84, the analysis preferably begins with a visual inspection of the image and its subjective comparison with another soils data source, such as a regional soils association or detailed soils series survey map to ensure that the satellite data is providing additional detail to the map and not substantially contradicting it.

As shown in block 86, one or more sources of data are selected to provide detailed soils information for respective basin areas. These detailed data sources include soils data reports and maps that are typically compiled from field surveys conducted for municipal and provincial governments. These local surveys can be more detailed in the sense of including data for more basin locations, than state or regional soils association maps because such surveys generally cover a smaller geographic area, thereby making the collection and analysis of more soil samples manageable. As will be described in further detail below, the detailed soils data from these local surveys is used to locate at least one basin area having each of the HSG classifications which can be analyzed to develop training sets and to substantiate classifications assigned to image pixels by computer analysis employing the training sets. In cases where municipal and county soils data is not available, independent field surveys of selected basin areas can be performed to locate areas comprising soils in each specified soil class. The data, which is obtained from a plurality of samples taken during field trips to the basin 12, is preferably divided into two groups. Half of the data is used to create training sets as described in connection with block 94, while the other half of the samples data is stored in a blind file in computer memory for later use with classification accuracy calculations.

Generally, training sets are sets of binary numbers that correspond to the reflected radiation levels detected by the sensor system 14 for a particular resource being classified. These sets are used to facilitate computer-directed association of certain radiation levels with, for example, respective classes of soils. Several training sets are preferably generated for each of the HSG classifications to account for variability which naturally occurs among the basin soils. This variability arises from the fact that several soil types can constitute a single HSG, and that each of these soil types can be affected differently when exposed to the same rainfall event. That is, the moisture content of some types of soil causes slightly more or less radiation to be reflected than from other types of soil. Accordingly, each soil HSG has a characteristic spectral reflectance pattern which corresponds to the different wavelengths of radiation that are reflected and absorbed by the soil. Each training set, therefore, is configured so as to comprise a plurality of binary reflectance values that are commonly associated with the spectral reflectance patterns of soil types constituting a particular HSG.

With reference to block 88, the computer 26 is programmed to correspond known HSG classifications for various portions of the basin 12, which are obtained from detailed soils series survey maps and field trip data, with the binary reflectance values that were detected for the parcel of land, as represented by image pixels, by the sensor system 14. As indicated by decision block 90, if the image cannot be sufficiently correlated with the areas of known HGS classification, based on the precipitation criteria selection, the precipitation criteria can be reexamined, as indicated by decision block 76, or an alternative data source can be used, as indicated by blocks 78 and 80. As shown in block 92, the bands of radiation which are detected by the sensor system 14 can be selectively analyzed by the computer for each of these localities to obtain their respective spectral reflectance patterns. For example, if LANDSAT is used to capture images, then various combinations of the seven bands of the satellite image can be analyzed by the computer 26.

Several training sets are preferably created by the computer for each HSG class utilizing the spectral reflectance patterns obtained for locales of a known HSG, as shown in block 94. As described earlier, a training set for an HSG generally represents a spectral reflectance pattern that a pixel obtained for a locale is likely to exhibit if the locale is characterized by that HSG. Before the training sets are used by the computer to classify pixels in locales of unknown HSG, statistical analysis is preferably performed on the pixel values in the training sets, as indicated by block 96. The statistical analysis comprises, among other things, examining the minimum and maximum values for all pixels in each wavelength band of the training set. This ensures that the pixel data comprises a reasonable indication of a particular HSG. The mean, median, standard deviation, variance, and histogram relating data values to the frequency of their occurrence are calculated for each wavelength band to determine how closely the pixels of the training set follow a normal, bell-shaped distribution. Further, the covariance matrix of each training set is calculated to examine the tendencies of values for the same pixel, but in different wavelength bands, to vary with each other in relation to the means of their respective bands. If the statistical data indicates that the training sets do not distinguish between two HSG classes, the training sets can be modified, as indicated by blocks 98 and 100. If the statistical analysis reveals satisfactory training sets for distinguishing between HSG classes, the training sets are stored in computer memory, as indicated by block 102, for subsequent recall and application in the manner described below.

Figure 10A:
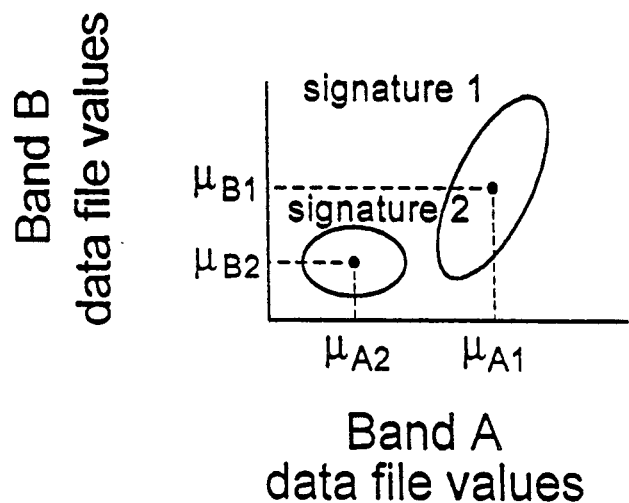
FIGS. 10A and 10B are graphs illustrating the results of a statistical analysis performed on two exemplary spectral reflectance patterns.
Figure 10B:
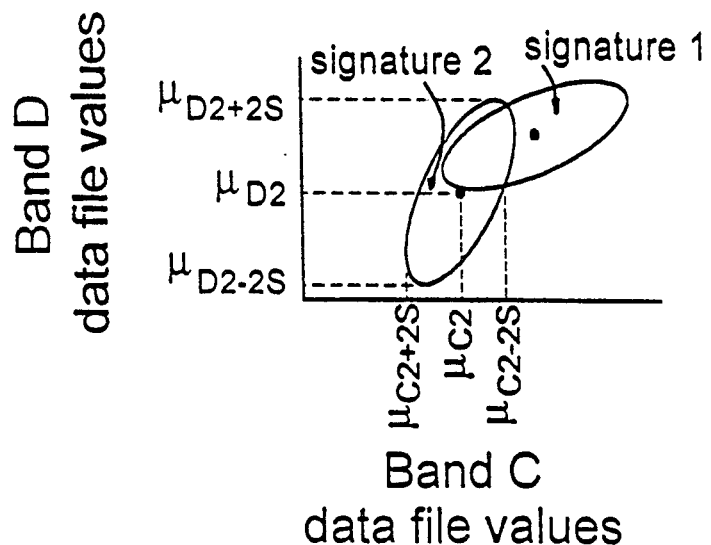

With further reference to block 96, training sets developed by the computer can be analyzed, for example, using an appropriate ellipse program. The ellipse program allows for the computer to plot on a monitor, for example, the area covered by the mean data value of a training set, along with plus or minus a given number of standard deviations, for any two-band combination of data. FIGS. 10A and 10B illustrate the ellipse evaluation of a first spectral reflectance pattern, signature 1, and a second spectral reflectance pattern, signature 2, for bands A and B and for bands C and D, respectively. With reference to FIG. 10A, the training sets from two different resources are separable in at least one of the band combinations (e.g., bands A and B) since there is no overlap in the signature values. Signature overlap between bands C and D is illustrated in FIG. 10B. The areas where the ellipses for signature 1 and signature 2 intersect indicate overlap of training set statistics. The occurrence of such overlap is to be avoided, for it introduces classification uncertainty.

The divergence of training set statistics can be determined by a computer using, for example, the Jeffries-Matusita distance formula to determine the optimum number and combination of bands for use in classifying soil types in an image. With respect to the various combinations of wavelengths which include infrared bands, the 4, 5, 3 combination of wavelengths associated with LANDSAT are particularly effective for identifying HSG "D" areas in an image which exhibit poor drainage characteristics. The substantial moisture content of these areas tends to absorb infrared radiation. These areas are, therefore, characterized by low binary numbers in the image data. Reflectance values that typify the other HSG classifications are relatively more difficult to ascertain. The 7, 4, 1 and 7, 4, 2 band combinations of LANDSAT are particularly effective for differentiating between different HSG areas. It is to be understood, however, that other combinations of LANDSAT wavelength bands can be useful depending on the objectives of the image analysis. Further, other sensor systems besides LANDSAT having different wavelength band detection capabilities can be used.

With reference to block 104, the computer is directed in accordance with appropriate program control to classify the pixels comprising the image (i.e., assign an appropriate HSG classification to each pixel) by comparing pixel values with the information contained in the training sets. Several algorithms, such as the maximum likelihood classification algorithm, are available to control computer classification operations. The maximum likelihood classification algorithm employs the following equation and uses training set statistics to ensure that a candidate pixel is assigned to the HSG class to which it has the greatest probability of occurring:

$$D = ln(a_c) - [0.5ln(|Cov_c|)] - 0.5(X - M_c)^T \cdot (Cov_c^{-1})(X - M_c)]$$

wherein
D = weighted distance (likelihood),
c = a particular class,
x = the measurement vector of the candidate pixel,
$M_c$ = the mean vector of the sample of class c,
$a_c$ = percent probability that any candidate pixel is a member of class c (defaults to 1.0, or is entered from a priori knowledge),
$Cov_c$ = the covariance matrix of the pixels in the sample of class c,
$|Cov_c|$ = determinant of $Cov_c$ (matrix algebra),
$Cov_c^{-1}$ = inverse of Cov (matrix algebra),
ln = natural logarithm function,
T = transposition function (matrix algebra),
and the pixel is assigned to the class, c, for which D has the lowest value.

The classified soils data is subsequently rectified and georeferenced as indicated by block 106. Rectification is the process of projecting the satellite image onto a plane, thereby allowing the image to conform to a projection system. Georeferencing involves relating the classified data to a real world coordinate system. The Universal Transverse Mercator (UTM) projection system, developed by the U.S. Corps of Army Engineers, is preferably used because the system is a world-wide coordinate system which allows for georeferencing of a raster database containing satellite data within a prescribed level of accuracy. The georeferencing process involves determining UTM coordinates for various landmarks within the basin and locating the landmarks on the classified image to obtain the abscissa (X) and ordinate (Y) file coordinates. The UTM and file coordinates are subsequently utilized by a transformation program to assign UTM coordinates to each pixel in the image data file, creating a grid file that is oriented with respect to the selected landmarks.

The georeferenced, classified soils data is examined by the computer to identify pixels which were not assigned to a particular HSG classification due to image data anomalies arising, for example, from vegetative interference with image capture. The classification process described in connection with block 104 is preferably used in connection with an appropriate thresholding algorithm which is designed to eliminate from consideration by the computer all of the pixels whose reflectance values or spectral response patterns are too different from that of the candidate pixel during the classification process. The thresholding procedure is particularly useful in preventing the computer from erroneously classifying pixels when, due to vegetative or other interference, the computer has not been provided with sufficient data relating to the underlying soil associated with candidate pixels. It can therefore be appreciated that the use of a thresholding procedure is useful in maintaining the accuracy of the classification process.

With reference to block 108, further processing is undertaken to assign HSG classifications to pixels that were left unassigned due, among other reasons to, vegetative or other interference. This additional classification process can be viewed as being analogous to moving a rectangular window comprised of many panes across the classified soils data. When the center of the "window" arrives at an unclassified pixel, the area underlying each of the window panes is examined by the computer in accordance with one or more predetermined criteria. The numeric value which appears most frequently (i.e., in the most window panes) is assigned to the unclassified pixel in the middle of the window. A rectangular window can, for example, be dimensioned to cover a 16×16 pixel area of the image such that 256 individual pixel values are examined to determine a value for the unclassified center pixel.

With reference to block 110, the georeferenced, classified soils data is processed to determine the extent to which pixels were left unassigned during the foregoing classification process due, for example, to cloud cover interference with image capture. The need for cloud cover compensation of the classified soils data is generally expected due to the precipitation requirements for capturing an image which contains sufficient information to allow HSG mapping. The data sources 38 (FIG. 2) which are provided to the computer 26 are preferably the most recent state or regional soils association map or soil series survey map that is available for the land area under study. Data relating to the percentage of each soil series within each soil association can usually be obtained. A soil series is a group of unique soil types that vary in the ground slopes on which they are formed as determined by soil taxonomy. Several soil series, i.e., several unique types of soils, can be combined in an association which can be displayed with different soil series associations on a map to illustrate, for example, different HSG soils, or soils with different infiltration rates. Under the control of the GIS software, the computer digitizes the existing soils association map and assigns UTM coordinates to various landmarks incident to preparation of a new or revised soil map. Further, in accordance with the present invention, the computer is provided with tabular data concerning the soil composition of soil series within each of the associations. The computer is operable to "weigh" each soil series according to its percentage in the association and HSG such that a weighted HSG can be determined for each of the soil polygons on the newly-developed soil map. The new soil map is electronically overlaid with the georeferenced, classified soils data by the computer under control of the GIS software. The data from both the new soil map and the soils data GIS layers are properly aligned because both GIS layers are georeferenced to the same coordinate system. Following overlaying, the computer is operable to re-examine the classified soils data and provide the classified data GIS layer with data from the newly-developed soil map in areas previously identified as being covered by clouds.

With reference to block 112, the accuracy of the georeferenced, classified soils GIS layer, which has been compensated for, among other discrepancies, vegetative and cloud cover interference, can then be verified. One method for determining the accuracy of the computer analysis is to compare the soil sample data contained in the blind file with the results of the soil analysis. Other methods for determining the accuracy of the computer analysis, however, can be used. If the classified soils GIS layer is not sufficiently accurate, the training sets are generally modified and stored in computer memory for use in further processing. New training sets are usually generated following the establishment of different precipitation criteria and the selection of an image by the computer which substantially meets the new criteria.

The manner in which ground cover classifications are determined for the basin 12 will now be described with reference to FIG. 11. As used herein, the term "ground cover classification" describes the process by which natural (forests, meadows, and so on) and artificially-created features (roads, buildings, and so on) on the ground are analyzed. Initially, the process involves generating a remotely sensed, digitized image which can be processed in the manner described below by the computer 26 in accordance with suitable program instructions. With reference to block 122, the imaging system, (i.e., the satellite 10) is preferably operated to obtain several images of geographic regions located along the imaging system flight path during an optimal time period described below in connection with block 122. The remote imaging system typically must pass by the selected basin 12 several times to obtain a sufficient number and variety of images for the basin 12. These images are maintained in a database stored in appropriate memory means such as the optical disk 34.

As shown in block 122, several sensor operation criteria are selected to obtain a suitable image for a ground cover study. These criteria are similar to those described in connection with block 70 in FIG. 9, such as the spectral and spatial resolutions of the sensing system and the time of the year during which images are preferably captured to allow for successful identification of various ground covers using the image data. The spectral and spatial resolutions required for successful ground cover imaging are generally satisfied by the resolutions of LANDSAT described above. As for the temporal criterion, images are preferably captured by the sensing system 14 when the trees in the basin 12 are substantially foliated and when the differences in maturity of various agricultural crops are most evident.

Before the computer is operated to select an image from the database of basin images for classification purposes, another temporal requirement is considered. With reference to blocks 124 and 126, "ground truth" (i.e., verification) information is obtained from several sources, such as field trips, state and national forest maps, land use maps of the type which are frequently developed by regional governments, and agricultural land use data of the type which is compiled by the U.S. Agricultural Stabilization and Conservation Service (ASCS) branch of the SCS. The ground truth information is generally used to insure the accuracy with which the computer 26 is directed to assign image data a ground cover classification. Once ground truth information has been obtained for the basin 12, this information is examined to determine its origination date. With reference to block 128, the computer searches images contained in the image database compiled for the ground cover study in block 122 to select an image which allows for classification using ground truth data and satisfies sensor operation criteria in block 122.

With reference to the negative branch of the decision block 130, if a suitable image for the ground cover study is not available, it is usually possible to generate additional images using the sensing system 14. The process of image generation for the ground cover study is not subject to the stringent temporal requirements set forth for the soil study because the capture of an image shortly after a rainfall is not necessary. Thus, the sensing system can be operated to capture another image of the basin 12 during another pass over the basin. As indicated in decision block 134, if satellite data is not used to obtain an image for the ground cover study, the computer under the control of GIS software can compile data from alternative data sources such as the land use maps described above to create a ground cover GIS layer as indicated in block 136.

Before classifying the image selected in block 128, the computer is preferably operated to process data from alternative sources, such as USGS hydrologic unit maps generated for each state in the United States, to delineate the boundaries of the basin 12 as indicated by block 138. For example, the hydrologic unit maps delineate river basins and sub basins in each state. The information in the hydrologic unit maps for the states in which the basin 12 is located is supplemented by quadrangle maps developed by the USGS to show hydrologic, natural and man-made features of geographic areas. The computer is operable to correlate the location of the basin boundaries, as determined from the hydrologic unit and quadrangle maps, with objects in the selected image to determine the boundaries of the study area more precisely. Further, the computer 26 is operable under the control of the IPS software to extract the area within the determined boundaries from the selected image. Thus, a new data file containing only the area within the basin limits is created and stored in, for example, appropriate memory means such as the optical disk 34, for further analysis.

The image selected in block 128 is electronically processed to assign to each image pixel a binary number that represents an appropriate land use class. With reference to block 140, the relevant land use classes are preferably those classes that are listed in the leftmost column of FIG. 7. These classes have been determined by the SCS to be relevant to the determination of the RCN. However, other appropriate classification schemes can be implemented in accordance with the teachings of the present invention.

As indicated by block 142, the computer processes the selected image data so as to enhance the data for the purpose of revealing patterns in the displayed image. For example, the individual band values in the raw image data listed in FIG. 7 are scaled within certain reflectance limits, and contrast stretches are performed on various wavelength bands to increase visual separability between different ground covers in the selected image. Further, the image data can be processed using an appropriate convolution algorithm to enhance delineation of the edges between various ground cover areas found within the basin 12. As indicated in block 144, the enhanced data obtained in block 142 is preferably visually analyzed to identify areas with particular ground covers from which training sets can be developed by computer analysis. The formulation, selection and examination of training sets can be used to assist in the process of computer-directed differentiation between different ground cover types and is indicated generally by block 148. As stated previously, computer analysis of various bands of the selected, remotely-sensed image generally indicates a unique reflectance response pattern for each type of resource shown on the RCN tabulation sheet of FIG. 7. As will be discussed in further detail below, the image pixels are subsequently classified in an appropriate ground cover class using the training sets and a classification algorithm.

With reference to blocks 146 and 148, a method which includes the step of obtaining training sets for each of the ground cover classes is used to classify image pixels. In order to develop appropriate training sets for such data, the computer is operable to analyze image data and data from other data sources, such as field data, to ascertain basin regions having different ground covers. If the ground cover region has a substantially well defined area, the computer 26 digitizes a polygon corresponding to the ground cover region in an overlay plane directly over the satellite image. A seed pixel is selected as the starting point of a search by the computer of all other pixels within the digitized polygon that fall within various spectral limits. These spectral limits can be specified as input data to the computer by a user based on user analysis of the spectral data obtained for that ground cover region. The computer searches the polygon to identify pixels that substantially match the criteria specified by the spectral limits. The pixels that are selected by the computer are subsequently visually examined to insure that the pixel data corresponds to a spectral reflectance pattern from a single resource. It should be understood that many classes of ground cover have more than one training set associated with them. For example, a total of about 130 or more training sets can be compiled throughout a basin in order to accurately delineate the ground cover categories listed in FIG. 7.

Before a training set is stored in computer memory, appropriate statistical analysis is performed by the computer on the pixels in each of the training sets, as indicated by block 150. The computer examines the minimum and maximum values for all pixels in each wavelength band to insure that sensible data was received from the sensor system 14. The mean, median, standard deviation and variance of each wavelength band is studied to determine how closely the pixels of a particular training set follow a normal bell-shaped distribution. Histograms relating the range of data values found for a particular ground cover are preferably compared with the frequency of their occurrence within the ground cover region. Further, the covariance matrix for each training set is preferably obtained to ascertain the likelihood of image data values for the same pixel, but in different bands, to vary with each other in relation to the means of their respective bands. Thus, the relationship that exists between the reflectance values obtained from one image band can be examined and appropriately electronically processed with respect to the reflectance values obtained for every other band. This information is useful in determining if a training set is coherent or will lead to confusion during classification.

With continued reference to block 150, the information contained in the training sets developed by the computer 26 can be further analyzed using an appropriate ellipse program as described in connection with block 96 in FIG. 9. Before performing image classification using the training sets created in block 148, the computer are operated to determine the divergence of training set statistics to identify which of the bands of satellite data, i.e., the seven bands of LANDSAT image, provides for the most accurate separation between the selected ground cover training sets. For example, the Jeffries-Matusita distance formula can be used to compute the divergence of training set statistics. The results of such a computation is useful to determine the optimum number and combination of bands for use in classifying the ground covers in an image. For an example study, the divergence statistics may reveal that all seven available wavelength bands of LANDSAT and their respective combinations are useful for discerning ground cover classifications in an image.

With reference to block 152, the computer 26 classifies the selected image using the training sets under the control of the classification algorithm. A suitable supervised classification algorithm is preferably employed, as it takes into account a priori information such as field survey data about the resources that a user wishes to identify. A maximum likelihood algorithm, as was described in connection with block 104 of FIG. 9, is preferably used to control the classification operations of the computer 26. Other supervised classification algorithms, such as parallelpiped classification and minimum spectral distance classification algorithms, can also be employed.

Following classification of the selected image, the image is rectified and georeferenced in a substantially similar manner as that used for the classified soils data, as described above with reference to block 106 (FIG. 9). The results of the initial classification of ground covers in an image are preferably further examined to determine the accuracy of the classification, as indicated by block 156. For example, the classified ground cover data is preferably initially examined visually to ensure that no obvious errors have occurred during classification, that is, that the training sets properly cover the range of data found within the image. Visual inspection of the classified ground cover data can also involve overlaying the classified ground cover data onto original ground cover data for the basin using the GIS software of the computer. The GIS software allows for the selective highlighting of areas on a ground cover GIS layer which is provided, for example, on a monitor, in order to identify which areas within the basin have been assigned to various classes. Further, several similar classes of ground covers could be highlighted on a screen to find possible areas of confusion. With reference to the decision block 160, the training sets can be altered if the classified image is found to be inaccurate, as indicated by block 162. Additional training sets can be created to allow the computer to more easily determine which ground cover class should be assigned to an unassigned pixel. Training sets that create confusing results can be deleted or combined.

In addition to a visual assessment of the accuracy of the classification process, several classification tests are preferably performed by the computer. For example, the computer can be operated to select various test pixels in the ground cover GIS layer and compare the corresponding classified data value to the original, unclassified image. The number of test pixels selected by the computer can be weighted according to the size of each ground cover class. For example, a greater number of test pixels is preferably taken from the largest ground cover classes within the basin rather than from those ground cover classes having just a few pixels assigned to them. Each of the selected test pixels is assigned a value by the computer which is determined by using a 3×3 pixel window that is overlaid onto the ground cover GIS layer. It is to be understood, however, that pixel windows of different dimensions and shapes can be used. The value assigned to the test pixel is preferably selected to be equal to the value of a majority of the pixels in the window. This value is then compared with the value that the test pixel should have received during the classification process. Classification accuracy assessment also preferably involves the use of data collected during various field trips to the basin 12 and subsequently stored in the blind file described above in connection with block 126.

Various computational functions of the computer 26 will now be described in connection with FIG. 12, which is a schematic diagram of the software input and output components that are generally employed in making rainfall-runoff determinations using a computer watershed model. Several watershed models have been developed and are available commercially, examples of which include the models TR20 and TR55 developed by SCS. These models have different output capabilities and formats. Some models can, for example, generate streamflow hydrographs and calculate such quantities as the Probable Maximum Flood (PMF) based on the RCN of the basin. The present invention shall be described for use with the HEC-1 model developed by the United States Army Corps of Engineers, which is preferably stored in the RAM 32 of the computer 26, although it is to be understood that other software watershed models can be used.

The HEC-1 model is operable with various input parameters and is generally used to simulate the precipitation-runoff process in a river basin; however, it has other capabilities which are related to this function, such as dam-break simulation and multiflood analysis using a single computer run. The HEC-1 model represents a basin under study as an interconnected system of hydrologic and hydraulic components. Each component models an aspect of the precipitation-runoff process within a portion of the basin which is commonly referred to as the subbasin. A component can, for example, represent a surface runoff entity, a stream channel, or a reservoir. The components are each represented by a set of parameters which specify particular characteristics of the component and mathematical relations representing physical processes associated with the component. These parameters and mathematical relations are used in connection with the input parameters to generate watershed model output data 12 such as flood hydrographs.

Figure 12:
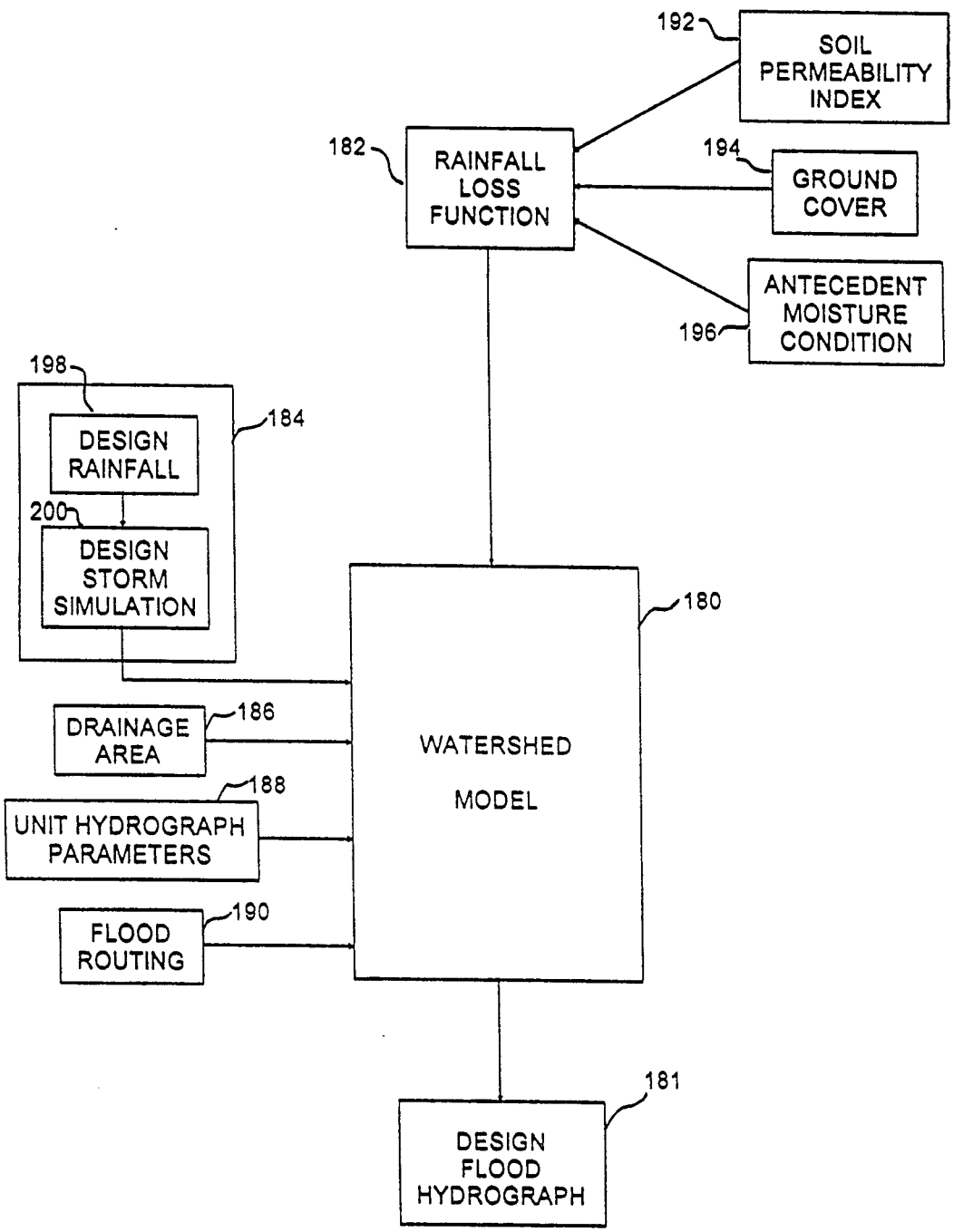
FIG. 12 is a schematic diagram of software and data input components provided to an image data processing system.

With further reference to FIG. 12, the input parameters to the computer watershed model 180 generally comprises a rainfall loss function 182, precipitation simulation data 184, drainage area values 186, unit hydrograph parameters 188, and flood routing parameters 190 such as the width, length and depth of natural channels in the basin 12 for determining the volume and time (or rate) of flow of water in the channels. These input parameters can be used by the watershed model 180 provided to the computer 26 to generate various kinds of output data 181 such as a value for Probable Maximum Flood (PMF) for the basin or design flood hydrographs based on historical and projected rainfall events.

The rainfall loss function 182 relates generally to the degree to which basin soils will absorb water from rainfall. The rainfall loss function 182 can, for example, be applied as an input to the watershed model 180 as an initial loss and a uniform loss rate for rainfall, or a decaying loss rate, e.g., RCN. Generally, rainfall loss functions depend on such factors as the soil permeability index 192, the ground cover 194 (i.e., the manner in which the land in the basin under study is being used), and antecedent moisture conditions 196. The soil permeability index 192 can be represented in a variety of ways, as for example by using permeability factors such as HSG or other appropriate soil classifications, or by using an infiltration rate for the soil. Both of these soil permeability factors can be computed using remote sensing techniques or by using detailed soils maps (when available). Land uses 194 (i.e., ground covers) can similarly be determined using remote sensing techniques. In instances where it is desirable to calculate the RCN for a selected basin, the soils and land use characteristics can be combined as a composite data layer using the GIS software for the calculation of an RCN by the computer 26, as described above in connection with FIGS. 6, 7 and 8.

The precipitation simulation data can be generated in a variety of ways. Precipitation data can be obtained, for example, using reports prepared by appropriate organizations and commercially available software programs to generate design rainfall data 198 relating to the duration and area coverage. The design rainfall data 198 can then be used to develop design storm data 200 which relates to the orientation of rainfall over an affected geographic region (i.e., the direction in which the storm is traveling). In particular, Hydrometeorological Report 51 (HMR 51), which is a table of data developed jointly by the U.S. National Weather Service and the U.S. National Oceanic and Atmospheric Administration, provides for the determination of probable maximum precipitation data. This data can be further processed by a software program Hydrometeorological Report 52 (HMR 52) to determine storm orientation, storm area and temporal distribution to yield a value for probable maximum storm (PMS). Thus, a rainfall loss function such as the RCN for a selected geographic area can be used in connection with precipitation simulation data such as the PMS and other input factors, which are discussed below in connection with FIG. 12, to yield a watershed model output value for probable maximum flood (PMF). In addition, precipitation simulation can be performed using general statistical values for rainfall. These statistical values can be obtained, for example, from a National Weather Service publication entitled *Technical Paper* 40 *Rainfall Frequency Atlas of the United States for Durations from Thirty Minutes to Twenty-Four Hours and Return Period from One to One Hundred Years* which was prepared by the United States Department of Commerce Weather Bureau, Washington, D.C. in 1961. The publication generally comprises data relating to different storm durations for various rainfall events occurring over 1, 2, 5, 10, 25, 50 and 100 year periods.

The foregoing detailed description is illustrative of various preferred embodiments of the present invention. It will be appreciated that numerous variations and changes can be made thereto without departing from the scope of the invention as defined in the accompanying claims.

What is claimed is:

1. A computer-implemented method for determining the interaction between precipitation and runoff in a selected geographic region, comprising the steps of:
    sensing electromagnetic energy patterns indicative of ground cover in said geographic region by remote sensing to obtain ground cover data relating to said geographic region;
    sensing electromagnetic energy patterns indicative of soil characteristics in said geographic region by remote sensing to obtain soil characteristic data relating to said geographic region; and
    inputting said group cover data and said soil characteristic data into a computer for performing the following steps:
    analyzing said ground cover data and said soil characteristic data to indentify a plurality of different ground covers and a plurality of different soil characteristics in said geographic region;
    classifying said geographic region in accordance with a plurality of ground cover classification data, and storing said ground cover classification data in memory of said computer;
    classifying said geographic region in accordance with a plurality of soil characteristic classes corresponding to said different soil characteristics to obtain soil characteristic classification data, and storing said soil characteristic classification data in memory of said computer;
    combining said ground cover classification data and said soil characteristic classification data and storing the combined classification data in memory of said computer; and
    determining from said combined classification data an expected runoff in said geographic region as a result of precipitation.

2. The method as claimed in claim 1, wherein said soil characteristic data comprises a hydrologic soil group classification.

3. The method of claim 1, wherein said soil characteristic data corresponds to a rate of fluid infiltration for soil.

4. An apparatus for determining the interaction between precipitation and runoff in a selected geographic region, comprising:
    memory means;
    data gathering means coupled to said memory means for obtaining data relating to ground cover in said geographic region;
    remote sensing means coupled to said memory means for remotely sensing an electromagnetic energy pattern indicative of a soil characteristic in said geographic region; and
    processing means coupled to said memory means for combining said ground cover data and said soil characteristic data to obtain an indication of expected runoff in said geographic region as a result of precipitation.

5. A method for determining the interaction between precipitation and runoff in a selected geographic region, comprising the steps of:
    obtaining data relating to ground cover in said geographic region;
    sensing an electromagnetic energy pattern indicative of a soil characteristic in said geographic region with remote sensing means to obtain soil characteristic data relating to said geographic region; and
    combining said ground cover data and said soil characteristic data to determine expected runoff in said geographic region as a result of precipitation.

6. The method of claim 5, wherein said step of obtaining ground cover data comprises the step of analyzing field data taken for at least a portion of said geographic region.

7. The method of claim 5, wherein said step of obtaining ground cover data comprises the step of analyzing a map of at least a portion of said geographic region which comprises land use data.

8. The method of claim 5, wherein said step of obtaining ground cover data comprises the step of sensing the ground cover in said geographic region using remote sensing means.

9. The method of claim 5, wherein said combining step comprises the steps of:
   analyzing said ground cover data and said soil characteristic data to identify a plurality of different ground covers and a plurality of different ground covers and a plurality of different soil characteristics in said geographic region;
   designating each of said plurality of different ground covers and each of said plurality of different soil characteristics as a ground cover class and a soil characteristic class, respectively;
   classifying said geographic region in accordance with said ground cover classes and storing ground cover classification data for said geographic region in memory means;
   classifying said geographic region in accordance with said soil characteristic classes and storing soil characteristic classification data for said geographic area in said memory means;
   combining said ground cover classification data and said soil characteristic data associated with said geographic region and storing the combined classification data in said memory means; and
   determining from said combined classification data a rainfall loss function for characterizing runoff in said geographic region.

10. The method of claim 9, further comprising the step of generating a hydrograph of said geographic region from hydrograph determination factors comprising said rainfall loss function and precipitation data.

11. The method of claim 9, wherein said determining step comprises the step of analyzing said combined classification data to identify portions of said geographic region characterized by different combinations of said ground cover classes and said soil characteristic classes.

12. The method of claim 11, wherein said soil characteristic classes correspond to different hydrologic soil groups.

13. The method of claim 12, wherein said determining step further comprises the steps of:
   selecting a runoff curve number factor which corresponds to each of said combinations of said ground cover classes and said hydrologic soil groups;
   calculating a runoff curve number for each of said portions of said geographic region by multiplying the area of said portion with a corresponding runoff curve number factor; and
   calculating the runoff curve number for said geographic region by summing the runoff curve numbers for each of said portions of said geographic region and dividing the sum by the area of said geographic region.

14. The method of claim 13, further comprising the step of modifying said runoff curve number for said geographic region using an antecedent moisture condition factor which represents the effect of antecedent precipitation on the runoff characteristics of said geographic region.

15. The method of claim 13, further comprising the step of generating a hydrograph of said geographic region from hydrograph determination factors comprising said runoff curve number for said geographic region and precipitation data.

16. The method of claim 13, wherein said selecting step comprises the step of selecting distinct runoff curve number factors for national forest and commercial forest ground cover classes.

17. A method for discriminating between areas in a geographic region which are characterized by a selected soil characteristic, comprising the steps of:
   sensing the electromagnetic energy patterns in said geographic region with remote sensing means to obtain image data relating to said geographic region;
   determining for at least one test location in said geographic region a soil characteristic which substantially characterizes said test location and storing test location data relating to said soil characteristic in memory means;
   comparing that portion of said image data which corresponds to said test location with corresponding test location data and generating relationship data which indicates correlation between said image data and said soil characteristic at said test location; and
   analyzing said image data for said geographic region using said relationship data to locate other areas in said geographic region which are substantially characterized by said soil characteristic.

18. The method of claim 17, wherein a plurality of pixels constituting said image data are associated with a plurality of binary data values, said binary values corresponding to levels of radiation reflected from said geographic region and detected by a plurality of electromagnetic sensors operable to sense different wavelength bands of electromagnetic radiation.

19. The method of claim 18, wherein said soil characteristic comprises fluid infiltration potential and said comparing step comprises the step of analyzing different combinations of said binary values which correspond to different ones of said electromagnetic radiation wavelength bands to determine which of said combinations substantially distinguishes soil having a first fluid infiltration potential from soil having a second fluid infiltration potential.

20. The method of claim 19, wherein said comparing step comprises the step of comparing said image data with said test location data which corresponds to a group of electromagnetic radiation wavelength bands comprising a band extending approximately from 2.08 micrometers to 2.35 micrometers, a band extending approximately from 0.76 micrometers to 0.90 micrometers, and a band extending approximately from 0.45 micrometers to 0.52 micrometers.

21. The method of claim 19, wherein said comparing step comprises the step of comparing said image data with said test location data which corresponds to a group of electromagnetic radiation wavelength bands comprising a band extending approximately from 2.08 micrometers to 2.35 micrometers, a band extending approximately form 0.76 micrometers to 0.90 micrometers, and a band extending approximately form 0.52 micrometers to 0.60 micrometers.

22. The method of claim 19, wherein said comparing step comprises the step of comparing said image data with said test location data which corresponds to a group of electromagnetic radiation wavelength bands comprising a band extending approximately from 0.76 micrometers to 0.90 micrometers, a band extending approximately from 1.55 micrometers to 1.75 micrometers, and a band extending approximately from 0.63 micrometers to 0.69 micrometers.

23. The method of claim 18, wherein said comparing step comprises the step of analyzing different combinations of said binary values which correspond to different ones of said electromagnetic radiation wavelength bands to determine which of said combinations substantially distinguishes soil having a predetermined fluid infiltration characteristic from other soil in said geographic region.

24. The method of claim 23, wherein said comparing step comprises the step of comparing said image data with said test location data which corresponds to a group of electromagnetic radiation wavelength bands comprising a band extending approximately from 0.76 micrometers to 0.90 micrometers, a band extending approximately from 0.63 micrometers to 0.69 micrometers, and a band extending approximately from 0.52 micrometers to 0.60 micrometers.

25. A method for determining a fluid infiltration potential of soil in a geographic region, comprising the steps of:
sensing electromagnetic energy patterns in said geographic region with remote sensing means to obtain image data relating to said geographic region;
storing said image data in a memory means; and
analyzing the stored image data to determine a fluid infiltration potential of soil in said geographic region.

26. The method of claim 25, wherein a plurality of pixels constituting said image data are associated with a plurality of binary data values, said binary values corresponding to levels of radiation reflected from said geographic region and detected by a plurality of electromagnetic sensors operable to sense different wavelength bands of electromagnetic radiation.

27. The method of claim 25, wherein said fluid infiltration potential comprises a hydrologic soil group classification.

28. The method of claim 27, wherein:
a plurality of pixels constituting said image data are associated with a plurality of binary data values, said binary values corresponding to levels of radiation reflected from said geographic region and detected by a plurality of electromagnetic sensors operable to sense different wavelength bands of electromagnetic radiation; and
said analyzing step comprises the step of analyzing binary values which correspond to more than one of said electromagnetic radiation wavelength bands to distinguish soil having a first hydrologic soil group classification from soil having a second hydrologic soil group classification.

29. The method of claim 28, wherein said electromagnetic radiation wavelength bands comprise a band extending approximately from 2.08 micrometers to 2.35 micrometers, a band extending approximately from 0.76 micrometers to 0.90 micrometers, and a band extending approximately from 0.45 micrometers to 0.52 micrometers.

30. The method of claim 28, wherein said electromagnetic radiation wavelength bands comprise a band extending approximately from 2.08 micrometers to 2.35 micrometers, a band extending approximately from 0.76 micrometers to 0.90 micrometers, and a band extending approximately from 0.52 micrometers to 0.60 micrometers.

31. The method of claim 28, wherein said electromagnetic radiation wavelength bands comprise a band extending approximately from 0.76 micrometers to 0.90 micrometers, a band extending approximately from 1.55 micrometers to 1.75 micrometers, and a band extending approximately from 0.63 micrometers to 0.69 micrometers.

32. The method of claim 28, wherein said electromagnetic radiation wavelength bands comprise a band extending approximately from 0.76 micrometers to 0.90 micrometers, a band extending approximately from 0.63 micrometers to 0.69 micrometers, and a band extending approximately from 0.52 micrometers to 0.60 micrometers.

* * * * *

UNITED STATES PATENT AND TRADEMARK OFFICE
CERTIFICATE OF CORRECTION

PATENT NO. : 5,323,317
DATED : June 21, 1994
INVENTOR(S) : Hampton et al

It is certified that error appears in the above-indentified patent and that said Letters Patent is hereby corrected as shown below:

On the title page, item [76], the address of inventor Terry L. Hampton is corrected to read as follows:

--7401 Voss Parkway, Middleton, Wisconsin 53562-3661--.

Signed and Sealed this

Twenty-seventh Day of September, 1994

Attest:

BRUCE LEHMAN

*Attesting Officer*  *Commissioner of Patents and Trademarks*